(12) United States Patent
Bainbridge

(10) Patent No.: US 12,489,675 B2
(45) Date of Patent: Dec. 2, 2025

(54) DISAGGREGATED NETWORK OPERATING SYSTEM

(71) Applicant: Ciena Corporation, Hanover, MD (US)

(72) Inventor: David Bainbridge, Summerville, SC (US)

(73) Assignee: Ciena Corporation, Hanover, MD (US)

( * ) Notice: Subject to any disclaimer, the term of this patent is extended or adjusted under 35 U.S.C. 154(b) by 26 days.

(21) Appl. No.: 18/347,958

(22) Filed: Jul. 6, 2023

(65) Prior Publication Data

US 2025/0016046 A1    Jan. 9, 2025

(51) Int. Cl.
*H04L 41/0806*    (2022.01)
*H04L 47/122*    (2022.01)

(52) U.S. Cl.
CPC ........ *H04L 41/0809* (2013.01); *H04L 47/122* (2013.01)

(58) Field of Classification Search
CPC .......................... H04L 41/0809; H04L 47/122
USPC ......................................................... 709/220
See application file for complete search history.

(56) References Cited

U.S. PATENT DOCUMENTS

| | | | | |
|---|---|---|---|---|
| 2013/0163426 A1* | 6/2013 | Beliveau | ................. | H04L 67/63 370/235 |
| 2015/0010000 A1* | 1/2015 | Zhang | ................... | H04L 45/742 370/392 |
| 2015/0195192 A1* | 7/2015 | Vasseur | ................... | H04L 45/28 714/47.3 |
| 2018/0124183 A1* | 5/2018 | Kozat | ................. | H04L 41/0894 |
| 2020/0313955 A1* | 10/2020 | Kodeboyina | ....... | H04L 49/3063 |
| 2022/0052944 A1* | 2/2022 | Hawkins | ............... | H04L 67/104 |
| 2022/0174005 A1* | 6/2022 | Limaye | ................... | H04L 45/38 |

(Continued)

OTHER PUBLICATIONS

"ArcOS", © 2023 Arrcus Inc. The hyperscale networking software company https://arrcus.com/connected-edge/arcos/#the-arcos-advantage, 2023, 5 pages.

(Continued)

*Primary Examiner* — Ario Etienne
*Assistant Examiner* — Kidest Mendaye
(74) *Attorney, Agent, or Firm* — Baratta Law PLLC; Lawrence A. Baratta, Jr.

(57) ABSTRACT

Systems, methods and apparatuses provide a disaggregated network operating system in which control plane and data plane components of the network operating system are distributed across a network controller and network elements. An information model describes a network element and identifies packet processing plug-ins executable by general purpose processors of the network element. The network controller uses the model to generate a packet pipeline program for execution by a programmable packet pipeline of the network element, and generates a list of packet processing plug-ins for handling offload conditions. The network controller transmits the packet pipeline program and list of packet processing plug-ins to the network element. The network element installs the packet pipeline program to the programmable packet pipeline and downloads the listed packet processing plug-ins. When the pipeline detects an offload condition, the pipeline forwards the network packet to the packet processing plug-in associated with the offload condition.

20 Claims, 13 Drawing Sheets

(56) References Cited

U.S. PATENT DOCUMENTS

| | | | | |
|---|---|---|---|---|
| 2023/0091195 A1* | 3/2023 | Zhang | ................. | H04L 49/1546 |
| | | | | 370/392 |
| 2023/0198883 A1* | 6/2023 | Sommers | ............ | H04L 43/0823 |
| | | | | 370/252 |
| 2023/0224217 A1* | 7/2023 | Subrahmanya | ....... | H04L 41/082 |
| | | | | 370/254 |
| 2023/0259352 A1* | 8/2023 | Kazatsker | ............... | G06F 21/57 |
| | | | | 717/172 |

OTHER PUBLICATIONS

"Cloud-native, Distributed Networking Software", © 2023 DriveNets; https://drivenets.com/products/dnos/DNOS—Drivenets Network Operating System, 2023, 6 pages.

Bremler-Barr, et al., "OpenBox: A Software-Defined Framework for Developing, Deploying, and Managing Network Functions", SIGCOMM '16, Aug. 22-26, 2016, Florianopolis, Brazil © 2016 ACM. ISBN 978-1-4503-4193-6/16/08. DOI: http://dx.doi.org/10.1145/2934872.2934875, Aug. 2016, pp. 511-524.

* cited by examiner

DISAGGREGATED NETWORK OPERATING SYSTEM

TECHNICAL FIELD

The disclosure is related to network operating systems, and more particularly, to a disaggregated network operating system.

DESCRIPTION OF RELATED TECHNOLOGY

A communication network is composed of a set of nodes and a set of links that connect one node to another to exchange data and share resources. A variety of devices operate to facilitate communication between the nodes. For example, a computer network may include network nodes such as routers, switches, gateways, firewalls, and a variety of other devices to provide and facilitate network communication. The nodes may be physical devices in which case links such as cables or wireless signals can connect the nodes with one another. The nodes may also be virtual devices, in which case software communication techniques can be used to link the nodes with one another. When a first node in the network sends a message to a second node in the network, the message may pass through many links and many nodes. The set of links and nodes that the message passes through while traveling from the first node to the second node is referred to as a path through the network. There may be more than one path between the first node and the second node.

Network functions can be characterized as control plane or data plane functions. The control plane is responsible for handling tasks such as routing, signaling, and network management, while the data plane is responsible for the actual transmission of user data. In traditional networking architectures control plane and data plane functions are tightly coupled. Control plane/data plane separation (also referred to as control plane/user plane separation) decouples the control and data plane functions into separate entities. This separation enables greater flexibility, scalability, and efficiency in managing and operating communication networks.

In architectures where there is control plane/data plane separation, the control plane handles the management and orchestration of network resources. The control plane is responsible for functions such as network planning, policy enforcement, service provisioning, and dynamic network configuration. The control plane makes decisions about how user data should be handled, such as determining the optimal paths for traffic routing. The data plane focuses on the actual transmission of user data. The data plane is responsible for packet forwarding, traffic handling, and applying necessary network functions to the data flow, such as encryption/decryption, deep packet inspection, or quality of service (QOS) enforcement. The data plane operates independently of the control plane, using instructions received from the control plane to perform its tasks.

Separating the control and data plane functions allows for greater flexibility and scalability. Control plane/data plane separation enables network operators to dynamically allocate resources, optimize network performance, and introduce new services or applications without disrupting the underlying infrastructure. Control plane/data plane separation also facilitates the deployment of virtualized network functions, enabling network operators to leverage the benefits of network function virtualization (NFV) and software defined networks (SDN).

SUMMARY

The systems, methods, and apparatuses of this disclosure each have several innovative aspects, no single one of which is solely responsible for the desirable attributes disclosed herein.

One aspect of this disclosure can be implemented as a non-transitory computer-readable medium having stored thereon instructions that, when executed by one or more processors of a network controller, cause the network controller to receive an information model for a network element. The instructions further cause the network controller to generate a packet pipeline program for a programmable packet pipeline of the network element in accordance with the information model, wherein the packet pipeline program includes instructions to detect one or more offload conditions. The instructions further cause the network controller to generate a first set of one or more identifiers, each identifier in the first set of one or more identifiers corresponding to one of a first set of one or more packet processing plug-ins downloadable by the network element, each packet processing plug-in in the first set of one or more packet processing plug-ins associated with one of the one or more offload conditions. The instructions further cause the network controller to transmit, to the network element, the packet pipeline program for the programmable packet pipeline and the first set of one or more identifiers.

Another aspect of this disclosure can be implemented as a non-transitory computer-readable medium having stored thereon instructions that, when executed by one or more processors of a network element, cause the network element to receive, from a network controller, a packet pipeline program for a programmable packet pipeline of the network element, wherein the packet pipeline program includes instructions to detect one or more offload conditions. The instructions further cause the network element to receive, from the network controller, one or more identifiers, each of the one or more identifiers corresponding to one of one or more packet processing plug-ins, each of the one or more packet processing plug-ins corresponding to one of the one or more offload conditions. The instructions further cause the network element to download, for execution on the network element, the one or more packet processing plug-ins. The instructions further cause the network element to receive a network packet; process the network packet by the programmable packet pipeline; and in response to the programmable packet pipeline detecting an offload condition while processing the network packet, transferring, by the programmable packet pipeline, the network packet to the packet processing plug-in corresponding to the offload condition.

A further aspect of this disclosure can be implemented as an apparatus including one or more processors. The apparatus can further include a programmable packet pipeline. The apparatus can further include a network element executable by the one or more processors. The network element can be configured to cause the one or more processors to receive, from a network controller, a packet pipeline program for the programmable packet pipeline, wherein the packet pipeline program includes instructions to detect one or more offload conditions. The network element can be configured to cause the one or more processors to receive, from the network controller, one or more identifiers, each of the one or more identifiers corresponding to one of one or more packet processing plug-ins, each of the one or more packet processing plug-ins corresponding to one of the one or more offload conditions. The network element can be configured to cause the one or more processors to download, for execution on the network element, the one or more packet processing plug-ins. The programmable packet pipeline is configured to: receive a network packet, process the network packet, and in response to the programmable packet pipeline detecting an offload condition while processing the network packet, transferring, by the programmable packet pipeline, the network packet to the packet processing plug-in corresponding to the offload condition.

Details of one or more implementations of the subject matter described in this disclosure are set forth in the accompanying drawings and the description below. Other features, aspects, and advantages will become apparent from the description, the drawings, and the claims.

Figure 1:
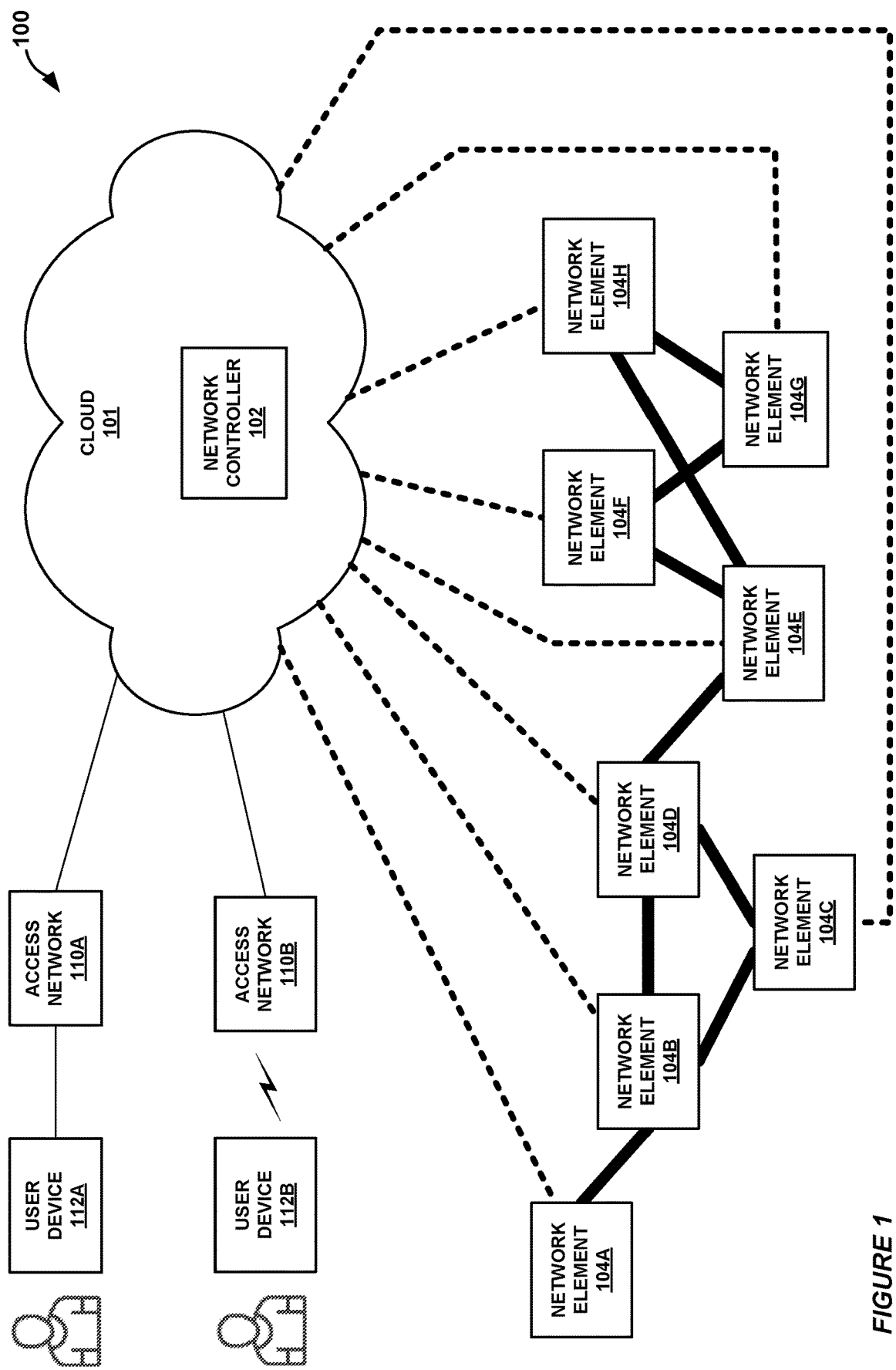
FIG. 1 is a block diagram illustrating an example network system having network elements that include a disaggregated network operating system, in accordance with aspects of the disclosure.

Note that the relative dimensions of the figures may not be drawn to scale.

DETAILED DESCRIPTION

The following description is directed to certain implementations for the purpose of describing innovative aspects of this disclosure. A person having ordinary skill in the art will readily recognize that the teachings herein can be applied in a multitude of different ways. The described implementations can be implemented in any means, apparatus, system, or method for processing network packets.

The techniques described herein are directed to systems, method, computer-readable media and apparatuses for a disaggregated network operating system (NOS) in which components of the network operating system can be distributed in various ways across a network controller and one or more network elements.

Traditional NOS implementations tend to be monolithic implementations in that they are fully deployed on a dedicated networking hardware and the control plane and data plane components are not separated. To the extent that traditional network operating systems provide control plane and data plane separation, the functionality and features provided by the data plane typically remain fairly static and such functionality and features are typically confined to dedicated networking hardware. There can be relatively long deployment cycles for data plane functionality and feature changes due to the specialized networking hardware and to customer certification processes. As a result, data plane functionality typically evolves slower than the control plane functionality, which typically can execute on commercial off the shelf (COTS) computing systems that are readily available and tested. Further, control plane functionality is typically considered software, thereby supporting a more rapid evolution.

In some aspects, a network element is described by an instance of an information model. The instance of the information model includes properties and capabilities intended for the network element. In some aspects, the network element can include a programmable packet processing pipeline executable on specialized packet processing hardware and/or firmware. The network element can also have one or more general purpose processors. The information model can include identifiers of packet processing plug-ins that are executable by the general purpose processors.

A network controller can receive the information model and generate a packet pipeline program for execution by the programmable packet pipeline, and can generate a list of packet processing plug-ins used by the programmable packet pipeline for handling certain offload conditions. The network controller can transmit the packet pipeline program and the list of packet processing plug-ins to the network element. Upon receipt of the packet pipeline program and the list of packet processing plug-ins, the network element can install the packet pipeline program to the programmable packet pipeline and download the packet processing plug-ins in the list of packet processing plug-ins from a repository. During operation of the network element, if the pipeline detects an offload condition, the pipeline can forward the network packet to the packet processing plug-in associated with the offload condition.

Particular aspects of the subject matter described in this disclosure can be implemented in a practical application to realize one or more of the following potential technical advantages. As an example, the packet processing or data plane portion of the NOS ("data plane NOS") is programmable such that as features are configured via the control plane, the data plane program can be dynamically updated to optimize support for the features and/or configuration. This can lead to better utilization of the packet processing capabilities of the data plane.

A further example advantage can be improved feature and bug fix velocity. Each feature of the data plane NOS can be implemented independently, teams can work concurrently on different aspects of the data plane NOS and merge the aspects into a finished product as testing is completed.

A further example advantage can be improved customer adoption velocity. Because the components which reside on the data plane NOS evolve independently of the control plane NOS, customers can certify the data plane NOS independently of the control plane NOS. Once the data plane NOS is certified and deployed, features can be added to the control plane without having to recertify the data plane.

FIG. 1 is a block diagram illustrating an example network system 100 having network elements and a network controller that include a disaggregated network operating system, in accordance with aspects of the disclosure. In the example shown in FIG. 1, network system 100 includes network controller 102 and network elements 104A-104H (generically "network element 104"). In some aspects, network controller 102 can be implemented in a cloud computing environment (e.g., cloud 101). In some aspects, network controller 102 can be implemented as a service provided by one or more servers in a data center or in an enterprise computing system.

Network elements 104A-104H can be entities that are responsible for forwarding network traffic through network system 100 and potentially to other systems outside of network system 100. A network element can be a physical device, a virtual device, or a combination of physical and virtual components. Each of the network elements 104A-104H can include a programmable packet processing pipeline that can be used to provide particularized functionality for the network element. For example, prior to programming the programmable packet pipeline, a network element may be considered a "blank canvass" upon which functionality can be added using packet pipeline programs that may be loaded on the network element by control plane components. For example, different packet pipeline programs can provide routing, switching, bridging, etc. functionality.

Network controller 102 manages aspects of the configuration and operation of network system 100. For example, network controller can configure network elements 104A-104H based on configuration information specified by an operator or administrator of network system 100. Like network element 104, network controller 102 element can be a physical device, a virtual device, or a combination of physical and virtual components.

End-users of network system 100 can access resources of network system 100 via access networks. For example, access network 110A can be a wired network provided by an Internet Service Provider. Client device 112A can be a device coupled to access network 110A and can access resources of network system 100 via access network 110A. Access network 110B can be a wireless network provided by a mobile network operator. Client device 112B can be a wireless device such as a smartphone, a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like.

Generally speaking, network controller 102 implements control plane functionality, and network elements 104A-104H implement data plane functionality. In the example shown in FIG. 1, control plane logical data paths are indicated by dashed lines, and data plane data paths are indicated by solid lines. For example, the network controller 102 may exchange management, monitoring, and configuration data via the control plane logical data paths. User data, such as data exchanged with target network nodes by user devices 110A or 110B via access networks 112A or 112B can be transferred along the data plane data paths.

Utilizing techniques of the disclosure described in further detail below, network controller 102 and network elements 104A-104H can be configured as a disaggregated network operating system. That is, components of the network operating system need not be tightly coupled, and may execute on the same machine (virtual or physical) or may execute on different machines. The components of the disaggregated network operating system will now be described.

Figure 2A:
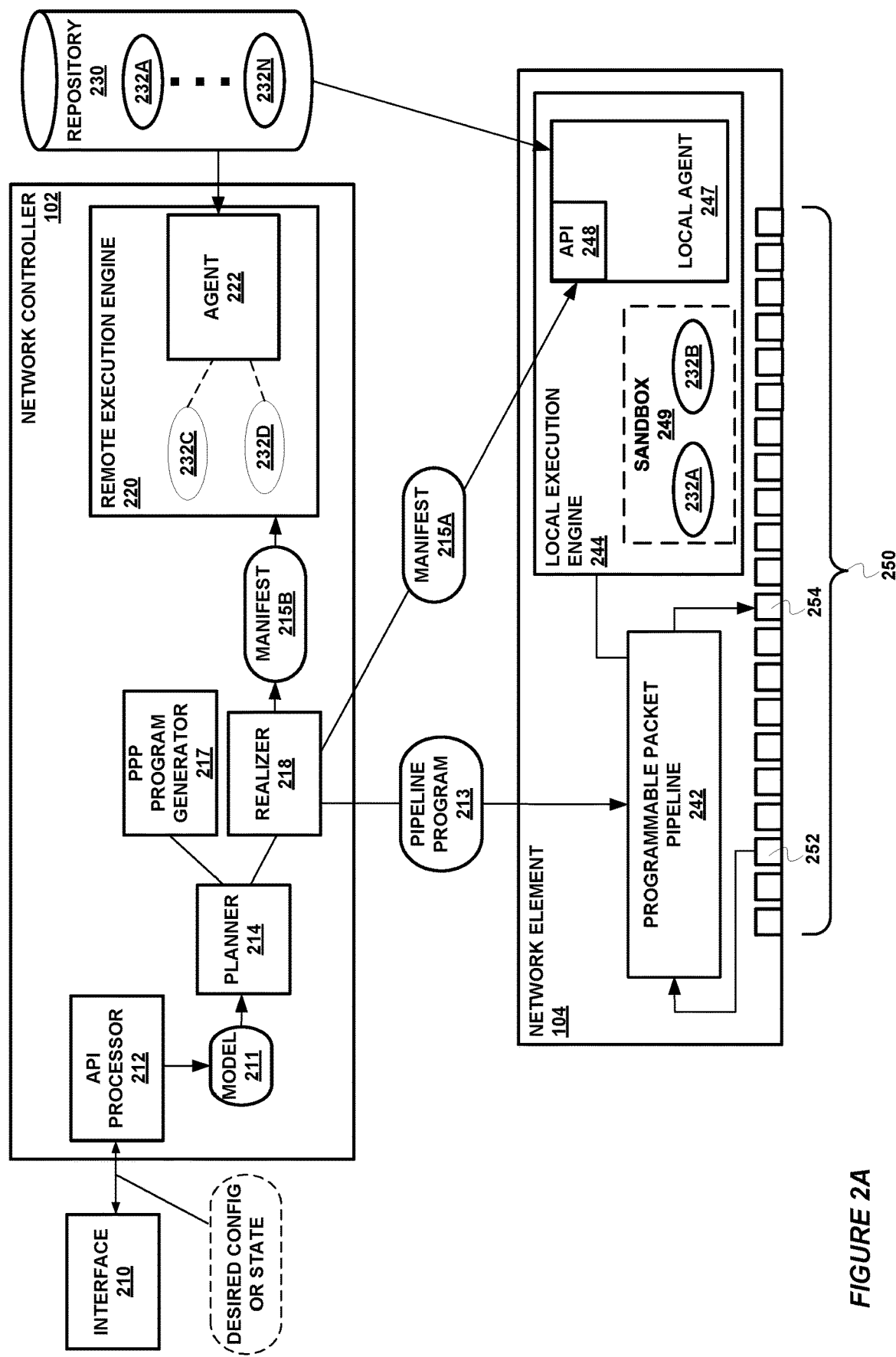
FIG. 2A is a block diagram illustrating a network controller, a network element, and a repository, in accordance with aspects of the disclosure.

FIG. 2A is a block diagram illustrating a network controller 102, network element 104, and repository 230, in accordance with aspects of the disclosure. Network element 104 typically provides data plane functionality while network controller 102 provides control plane functionality. As further described below, in some cases, network controller 102 may provide some data plane functionality. In some aspects, network element 104 may be configured and provisioned by network controller 102 as described in further detail below.

In some aspects, network element 104 includes ports 250, programmable packet pipeline 242 ("pipeline 242") and local execution engine 244. Network element's primary function is to process network packets received on a first one of ports 250 to determine a destination network node that is reachable via a second one of ports 250. A port upon which network element 104 receives a network packet can be referred to as an "ingress port". A port on which network element 104 forwards the network packet towards a destination network node can be referred to as an "egress port."

Pipeline 242 is a set of processing elements that can be organized into stages, that receive network packets via ports 250 and process the network packets to determine appropriate actions to take with respect to a network packet. For example, various stages of pipeline 242 may encapsulate the packet, change attributes of the packet such as MAC address, IP address port etc., determine an egress ports for the network packet among other actions. The processing elements of a stage of pipeline 242 typically receive the network packet, perform operations with respect to the packet, and forward the packet to the next stage for further processing until an egress port is determined. In some aspects, pipeline 242 can be specialized hardware and/or software that is designed to provide efficient low latency processing of network packets. For example, when implemented in hardware and/or firmware, pipeline 242 can be a set of field programmable gate arrays (FPGAs) or other programmable circuitry that is specialized for operations typically performed on network packets. When implemented in software, pipeline 242 can be a set of software modules that are optimized for packet processing operations.

Pipeline 242 is programmable, that is, the pipeline 242 can be customized with a program (e.g., a set of instructions and data) for processing network packets in a particular manner. As an example, a pipeline 242 may be programmed for a particular layer 2 network protocol. In some aspects, pipeline 242 may utilize one or more tables that are configured with data that enables pipeline 242 to determine an egress port for a packet. Network element 104 receives the program (e.g., pipeline program 213) from network controller 102 and installs the program for use by pipeline 242.

During routine operation of network element 104, a packet is received on one of ports 250, processed by pipeline 242, which determines one of ports 250 to use as the egress port of the packet. In the example shown in FIG. 2A, pipeline 242 receives a packet via ingress port 252 and, based on packet data such as packet header data, determines that the destination node of the packet can be reached via egress port 254. In this case, pipeline 242 can perform all of the operations necessary to determine the proper egress port.

In some cases, pipeline 242 may receive a network packet for which the pipeline may not be able to determine, on its own, the proper handling of the packet. These cases are referred to herein as "offload conditions." As examples, an offload condition may be an error condition in the packet, a condition where the pipeline needs further information and/or processing that is not available to the pipeline in order to properly handle the packet, or a condition where the packet can be handled by the pipeline, but the packet is subject to further analysis (e.g., traffic analysis, flow analysis, statistics collection etc.).

When the pipeline 242 detects an offload condition, the pipeline 242 can forward the packet to a packet processing plug-in associated with the offload condition. In some aspects, the pipeline 242 can detect an offload condition when one or more attributes of the network packet being processed match a pattern that defines the offload condition. As shown in FIG. 2A, a packet processing plug-in may be located on network element 104 (e.g., packet processing plug-ins 232A and 232B) or on network controller 102 (e.g., packet processing plug-ins 232C and 232D). A packet processing plug-in that is on the same physical machine or virtual machine as pipeline 242 can be referred to as a local packet processing plug-in. A packet processing plug-in that is located on a different physical machine or virtual machine than pipeline 242 can be referred to as a remote packet processing plug-in. Thus, in the case of a remote packet processing plug-in, the pipeline 242 forwards the packet to the remote plug-in via a network connection.

A packet processing plug-in (such as any of the packet processing plug-ins 232A, 232B, 232C, 232D) can provide various functions and capabilities that the packet pipeline 242 is not programmed to handle. As examples, a packet processing plug-in can provide or extend a network protocol (e.g., BGP, DHCP), provide firewall functionality, redirect packets, copy packets for later analysis, etc.

A packet processing plug-in may be one or more libraries of executable modules, one or more executable plug-in modules for a plug-in framework, or one or more containers including one or more executable modules for a container based framework.

Local execution engine 244 provides an execution environment for dynamically installing a packet processing plug-ins (e.g., plug-ins 232A and 232B). For example, local execution engine may include a dynamic library framework, a plug-in framework, or a container orchestration platform such as Kubernetes, Docker swarm, Mesos/Marathon, OpenShift, OpenStack, VMware, and Amazon ECS.

Because the packet processing plugins execute locally on the network element 104, processing latency can be lower than the latency involved with processing the packet remotely from network element 104 (e.g., on network controller 102). A packet processing plug-in may utilize other techniques to keep packet processing latency relatively low. For example, the packet processing plug-in can utilize technologies such as Data Plane Development Kit (DPDK), frameio, shared memory, etc. to reduce processing latency.

In some implementations, a packet processing plug-in may be executed within a "sandbox" (e.g., sandbox 249) implemented by network element 104, for example, by local execution engine 244. Executing a plug-in within a sandbox can be desirable, because should the plug-in fail to operate or exhibit other anomalous behavior, other functions of the network element are not corrupted or otherwise affected and the network element 104 remains operational and available for use.

Local agent 247 manages the instantiation of packet processing plug-ins on network element 104. Network controller 102 can communicate with local agent 247 to instruct, via API 248, the agent to install packet processing plug-ins on network element 104 based on an offload condition that may be detected by pipeline 242. In some aspects, local agent can retrieve (i.e., download) plug-ins from repository 230. Repository 230 may be located on a server, on network controller 102, or in a cloud environment.

In some aspects, when network element 104 receives a new or changed pipeline program 213, or new or changed packet processing plug-ins, network element 104 can implement the changes in such a way that existing network traffic (referred to as "packets in flight") are not disrupted. This can be accomplished using techniques such as "make then break" whereby the modified pipeline program can be defined, and packets are redirected to the new pipeline before the old pipeline is destroyed.

As noted above, network controller 102 manages one or more network elements. In some aspects, network controller 102 includes application program interface (API) processor 212, planner 214, programmable packet pipeline (PPP) program generator 217, realizer 218, and remote execution engine 220.

API processor 212 receives input from interface 210. Interface 210 facilitates interaction with network controller 102. For example, interface 210 can facilitate input of commands and data that can configure resources of network system 100, such as network elements 104. In some aspects, interface 210 can be a user interface, such as a graphical user interface that receives input from an end-user such as a network administrator or network user and provides output to the end-user. In some aspects, interface 210 can be a programmatic interface that facilitates input from a software program, such as a provisioning program, administrative program, or program. The input can represent an intent with respect to a network element. Intent can represent a desired network capability, which can result in the configuration of one or more network elements to implement the intent. For example, a network operator may provide input indicating an intent that a network element is to be configured as a layer 2 (L2) router. A network element can be configured to implement more than one intent.

API processor 212 processes the input received from interface 210 and generates or modifies an information model 211 for a network element based on the input. The information model 211 for the network element includes data that describes capabilities and features of the network element and can also describe connectivity provided by the network element. The same information model can be used to describe multiple network elements and connectivity provided by the network elements. In this regard, information model 211 can also be considered a connectivity model.

In some aspects, the information model 211 is an extensible model that includes one or more versioned schemas that can be dynamically added (i.e., new schemas), modified (i.e., new versions of existing schemas), or removed. The schemas can be derived by multiple means including manual definition or the schemas can be derived from other model schema languages such as Yet Another Next Generation (YANG), Open API, unified modeling language (UML), and so forth. In some aspects, the network controller 102 can store the schemas in a canonical versioned form such that multiple versions of the same schema can be supported simultaneously. Thus, the NOS can be self-describing, in that the supported schema and versions of that schema can be queried, for example, by an API client (e.g., interface 210).

An instance of a model 211 (a "model instance") can be associated with a network element (e.g., network element 104). The model instance is a set of specific property values that complies to a version of a schema or schemas defining the model. In addition to property values, components such as packet processing plug-ins can be associated with a schema or version of a schema.

Planner 214 can determine if a new model instance is added or if there have been changes in an existing instance of model 211, or a change to the model 211 itself. In some aspects, planner 214 is notified when a new model instance has been added, modified, or deleted. If planner 214 detects an addition of, or change in, an instance of a model or the model itself, planner 214 can query the instance of model 211 to determine a set of actions that need to be taken with respect to a network element associated with the model instance to achieve the intent represented by model 211. Planner 214 can provide the new or changed model instance to realizer 218 and PPP program generator 217.

PPP program generator 217 generates a pipeline program 213 based on the model 211 instance. The pipeline program 213 can implement a protocol for processing packets, where the protocol is identified by property values of the model 211 instance. The pipeline program can then forward, modify, replicate, drop, or perform other operations in accordance with the protocol. The processing of a packet can also modify the state or behavior of the network function.

Realizer 218 receives the model 211 instance and generates one or more lists of packet processing plug-ins (e.g., manifests) that are to handle offload conditions in pipeline program 213. In some aspects, realizer 218 can generate a manifest 215A of packet processing plug-ins that are to execute on network element 104. Realizer 218 provides manifest 215A to local agent 247 via API 248. In response to receiving the manifest 215A, local agent 247 can download the plug-ins indicated in manifest 215A from repository 230 and instantiate the plug-ins on network element 104. In some aspects, realizer 218 can generate a manifest 215B of packet processing plug-ins that are to execute on network controller 102. Realizer 218 provides manifest 215A to remote agent 222. In response to receiving the manifest 215A, remote agent 222 can download the plug-ins indicated in manifest 215B from repository 230 and instantiate the plug-ins on network controller 102.

In some implementations, remote execution engine 220, like local execution engine 244, provides an execution environment for dynamically installing a packet processing plug-ins (e.g., plug-ins 232C and 232D). For example, remote execution engine 220, when present, may include a dynamic library framework, a plug-in framework, or a container orchestration platform such as Kubernetes, Docker swarm, Mesos/Marathon, OpenShift, OpenStack, VMware, and Amazon ECS. Although not shown in FIG. 2, remote execution engine 220 may install plug-ins 232C and 232D in a sandbox.

Remote agent 222 manages the instantiation of packet processing plug-ins on network controller 102. Remote agent 222 installs packet processing plug-ins on the controller based on offload conditions that may be detected by pipeline 242. In some aspects, remote agent 222 can retrieve (i.e., download) plug-ins from repository 230. Although not shown in FIG. 2A, remote agent 222 can install packet processing plug-ins into a sandbox to prevent malfunctioning plug-ins from affecting the operation of network controller 102.

As will be appreciated from the above, the techniques disclosed herein can provide for processing network packets at differing levels of latency. For example, routine packet processing operations can be achieved by pipeline 242 with low latency. A packet processing plug-in 232 executing locally on network element 104 can perform packet processing operations for offload conditions with medium latency when compared to pipeline 242 and network controller 102. A packet processing plug-in 232 executing remotely on network controller 102 performs packet processing operations for offload conditions with relatively high latency when compared to pipeline 242 and local execution engine 244.

FIG. 2A has described the operations and components of a disaggregated network operating system for a network controller 102 and network element 104. Additionally, FIG. 2A has described routine packet processing where processing of the network packet by pipeline 242 occurs with no offload conditions detected by pipeline 242. FIGS. 2B-2E will now be discussed in the context of processing different types of offload conditions by packet processing plug-ins 232. In the examples shown in FIGS. 2B-2E, pipeline 242 is programmed as a seven stage pipeline, with blocks 272-278 representing the individual stages of pipeline 242. It is noted that a programmable packet pipeline 242 may have fewer or more stages than the seven stage shown in the example of FIGS. 2A-2G.

Figure 2B:
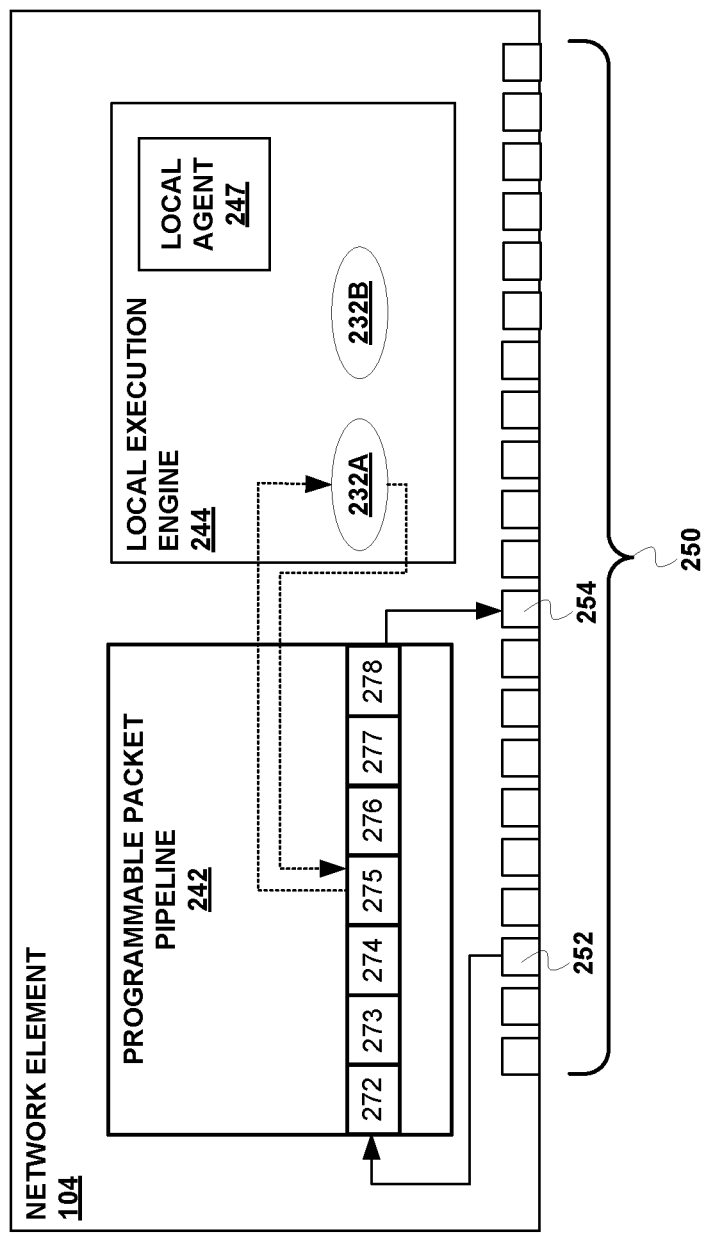
FIG. 2B is a block diagram illustrating a first example of a network element with a local downloadable packet processing plug-in, in accordance with aspects of the disclosure.

FIG. 2B is a block diagram illustrating a first example of a packet processing pipeline of a network element interoperating with a local downloadable packet processing plug-in, in accordance with aspects of the disclosure. In the example shown in FIG. 2B, a network packet has arrived on ingress port 252 of network element 104. Pipeline 242 receives the network packet and begins to process the network packet. At stage 275 of pipeline 242, an offload condition is detected. In response to detecting the offload condition, pipeline 242 transfers the network packet to the packet plug-in associated with the offload condition, plug-in 232A. Plug-in 232A performs processing on the network packet, and in this example, modifies the network packet. Plug-in 232A then returns the modified network packet to the pipeline 242, which can resume processing of the modified network packet. In some aspects, plug-in 242A can return the packet to pipeline 242 such that the packet is restarted in the pipeline. In some aspects, the packet can be returned to the pipeline with an instruction indicating an egress port for the packet. In the example shown in FIG. 2B, pipeline 242 continues to process the modified network packet and forwards the modified network packet towards the destination via egress port 254.

Figure 2C:
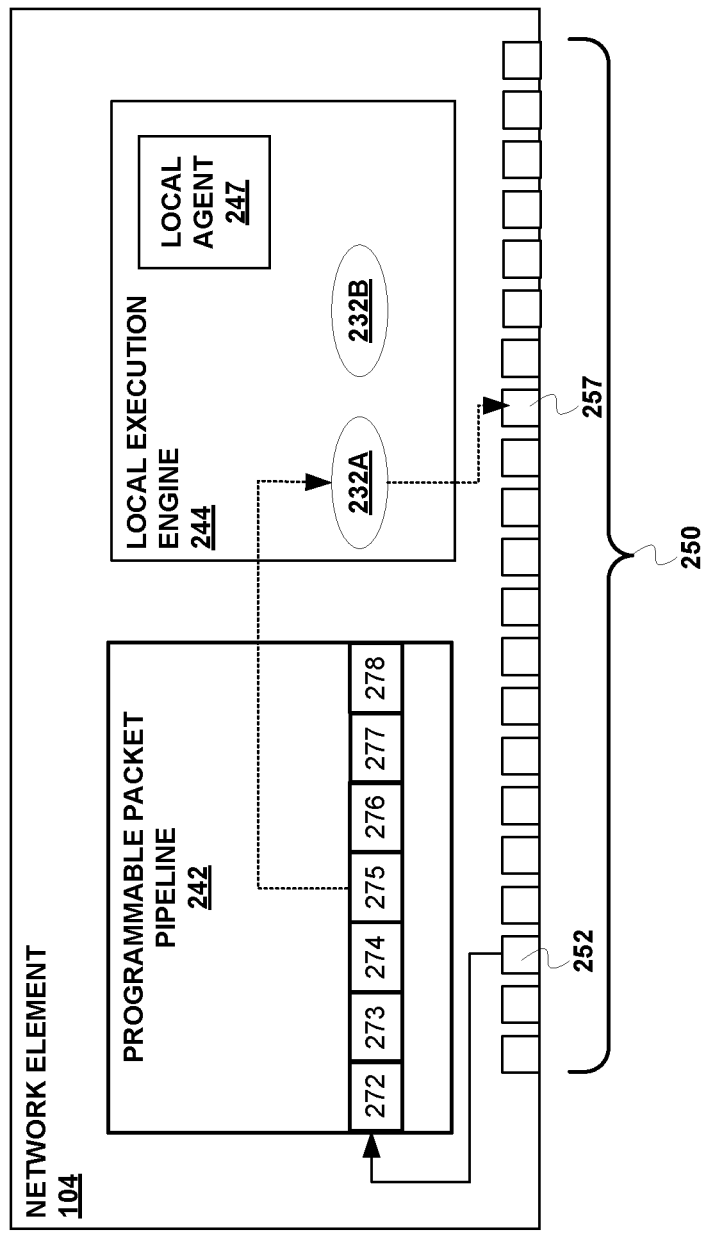
FIG. 2C is a block diagram illustrating a second example of a packet processing pipeline of a network element interoperating with local downloadable packet processing plug-in, in accordance with aspects of the disclosure.

FIG. 2C is a block diagram illustrating a second example of a packet processing pipeline of a network element interoperating with local downloadable packet processing plug-in, in accordance with aspects of the disclosure. In the example shown in FIG. 2C, a network packet has arrived on ingress port 252 of network element 104. Pipeline 242 receives the network packet and begins to process the network packet. At stage 275 of pipeline 242, an offload condition is detected. In response to detecting the offload condition, pipeline 242 transfers the network packet to the packet plug-in associated with the offload condition, plug-in 232A. Plug-in 232A performs processing on the network packet, and in this example, determines that the network packet should be forwarded towards its destination via egress port 257, and does not return the network packet to pipeline 242 for further processing.

Figure 2D:
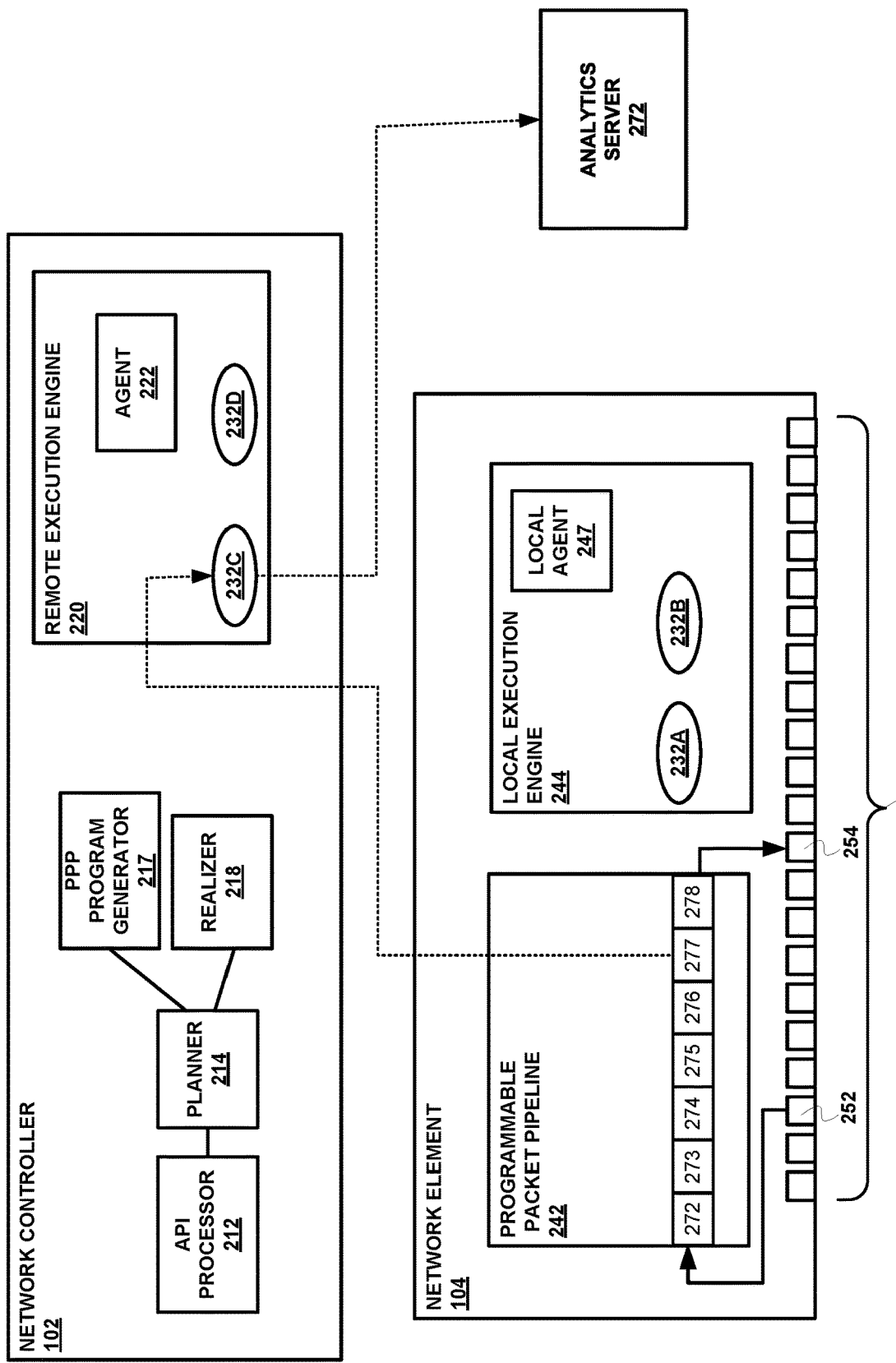
FIG. 2D is a block diagram illustrating an example of a packet processing pipeline of a network element interoperating with a remote downloadable packet processing plug-in, in accordance with aspects of the disclosure.

FIG. 2D is a block diagram illustrating an example of a packet processing pipeline of a network element interoperating with a remote downloadable packet processing plug-in, in accordance with aspects of the disclosure. In this example, plug-in 232C may be configured to perform analysis of a network packet. For example, plug-in 232C may perform statistical analysis, network flow analysis (e.g., SFLOW or NETFLOW), or other types of analysis on the network packet. In the example shown in FIG. 2D, a network packet has arrived on ingress port 252 of network element 104. Pipeline 242 receives the network packet and begins to process the network packet. At stage 277 of pipeline 242, an offload condition is detected. In response to detecting the offload condition, pipeline 242 forwards a copy of the network packet to the packet plug-in associated with the offload condition, plug-in 232C on network controller 102. Because the plug-in 232C is a remote plug-in (e.g., not local to network element 104), the network packet may be transferred to network controller 102 via a network connecting network controller 102 to network element 104. In this example, plug-in 232C does not perform any operations that would affect the routing of the network packet. Pipeline 242 continues to process the network packet, and in this example, determines that the network packet should be forwarded towards its destination via egress port 254. Plug-in 232C can perform statistical analysis of the network packet itself, or can forward the copy of the network packet to analytics server 272 for analysis.

Figure 2E:
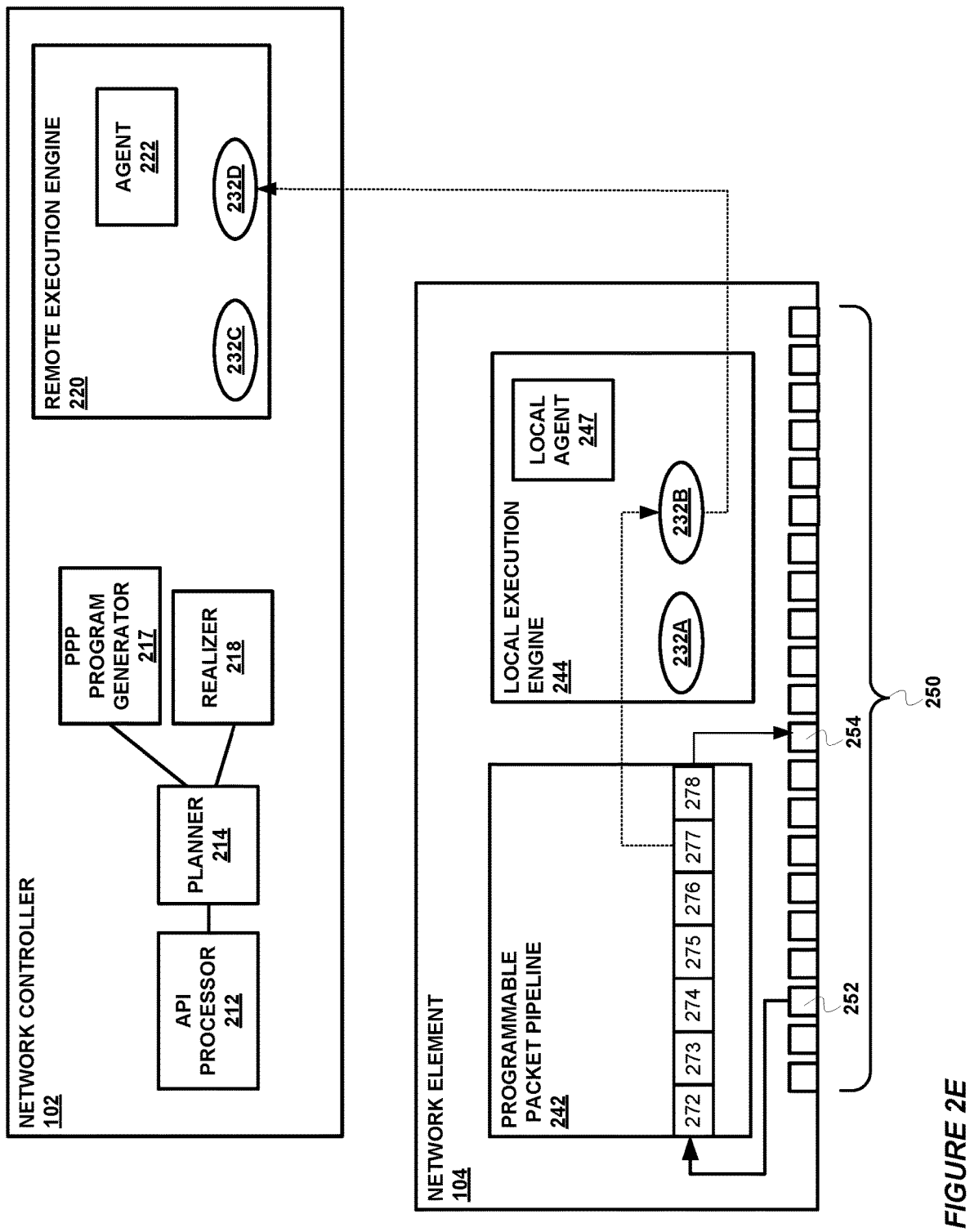
FIG. 2E is a block diagram illustrating an example of a packet processing pipeline of a network element interoperating in parallel with a local downloadable packet processing plug-in and a remote downloadable packet processing plug-in, in accordance with aspects of the disclosure.

FIG. 2E is a block diagram illustrating an example of a packet processing pipeline of a network element interoperating in parallel with a local downloadable packet processing plug-in and a remote downloadable packet processing plug-in, in accordance with aspects of the disclosure. In the example shown in FIG. 2E, a network packet has arrived on ingress port 252 of network element 104. Pipeline 242 receives the network packet and begins to process the network packet. At stage 277 of pipeline 242, an offload condition is detected. In response to detecting the offload condition, pipeline 242 forwards the network packet to the packet plug-in associated with the offload condition, plug-in 232B on network element 104. Plug-in 232B processes the network packet, and determines that further processing of the network packet is required by plug-in 232D on network controller 102. Because the plug-in 232D is a remote plug-in (e.g., not local to network element 104), plug-in 232B may transfer the network packet to network controller 102 via a network connecting network controller 102 to network element 104. In this example, plug-ins 232B and 232D do not perform any operations that would affect the routing of the network packet. Thus, pipeline 242 may continue to process the network packet, perhaps in parallel with plug-ins 232B and 232D. In this example, determines that the network packet should be forwarded towards its destination via egress port 254.

Figure 2F:
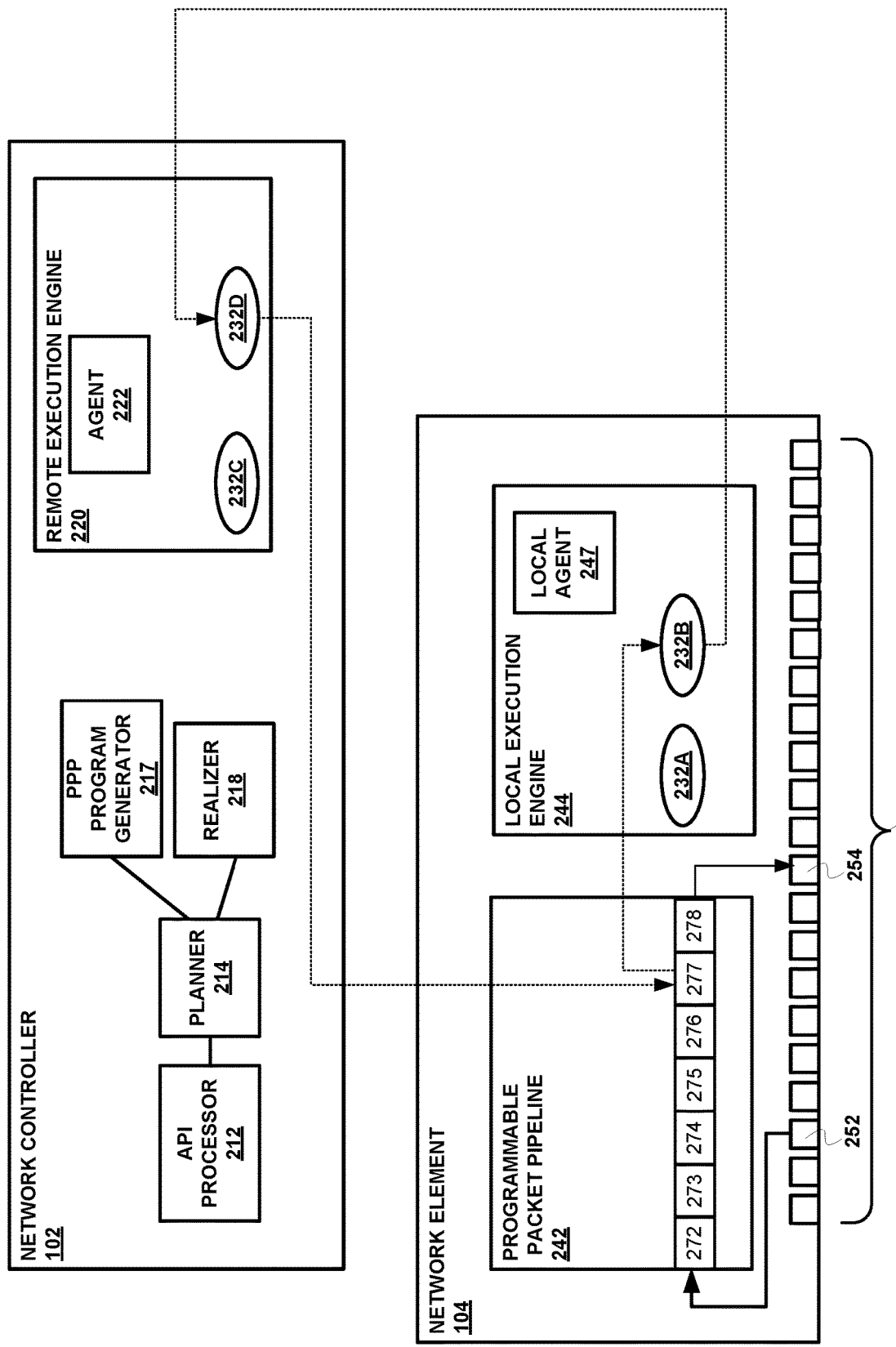
FIG. 2F is a block diagram illustrating an example of a packet processing pipeline of a network element interoperating in serial with a local downloadable packet processing plug-in and a remote downloadable packet processing plug-in, in accordance with aspects of the disclosure.

FIG. 2F is a block diagram illustrating an example of a packet processing pipeline of a network element interoperating in serial with a local downloadable packet processing plug-in and a remote downloadable packet processing plug-in, in accordance with aspects of the disclosure. In the example shown in FIG. 2F, a network packet has arrived on ingress port 252 of network element 104. Pipeline 242 receives the network packet and begins to process the network packet. At stage 277 of pipeline 242, an offload condition is detected. In response to detecting the offload condition, pipeline 242 forwards the network packet to the packet plug-in associated with the offload condition, plug-in 232B on network element 104. Plug-in 232B processes the network packet, and determines that further processing of the network packet is required by plug-in 232D on network controller 102. Because the plug-in 232D is a remote plug-in (e.g., not local to network element 104), plug-in 232B may transfer the network packet to network controller 102 via a network connecting network controller 102 to network element 104. Plug-in 232D processes the network packet received from plug-in 232B. In this example, plug-in 232B and plug-in 232D may perform processing that affects the routing of the network packet. Thus, upon completion of the processing, plug-in 232D returns the network packet to the pipeline 242. Pipeline 242 continues to process the network packet, and in this example, determines that the network packet should be forwarded towards its destination via egress port 254.

Figure 2G:
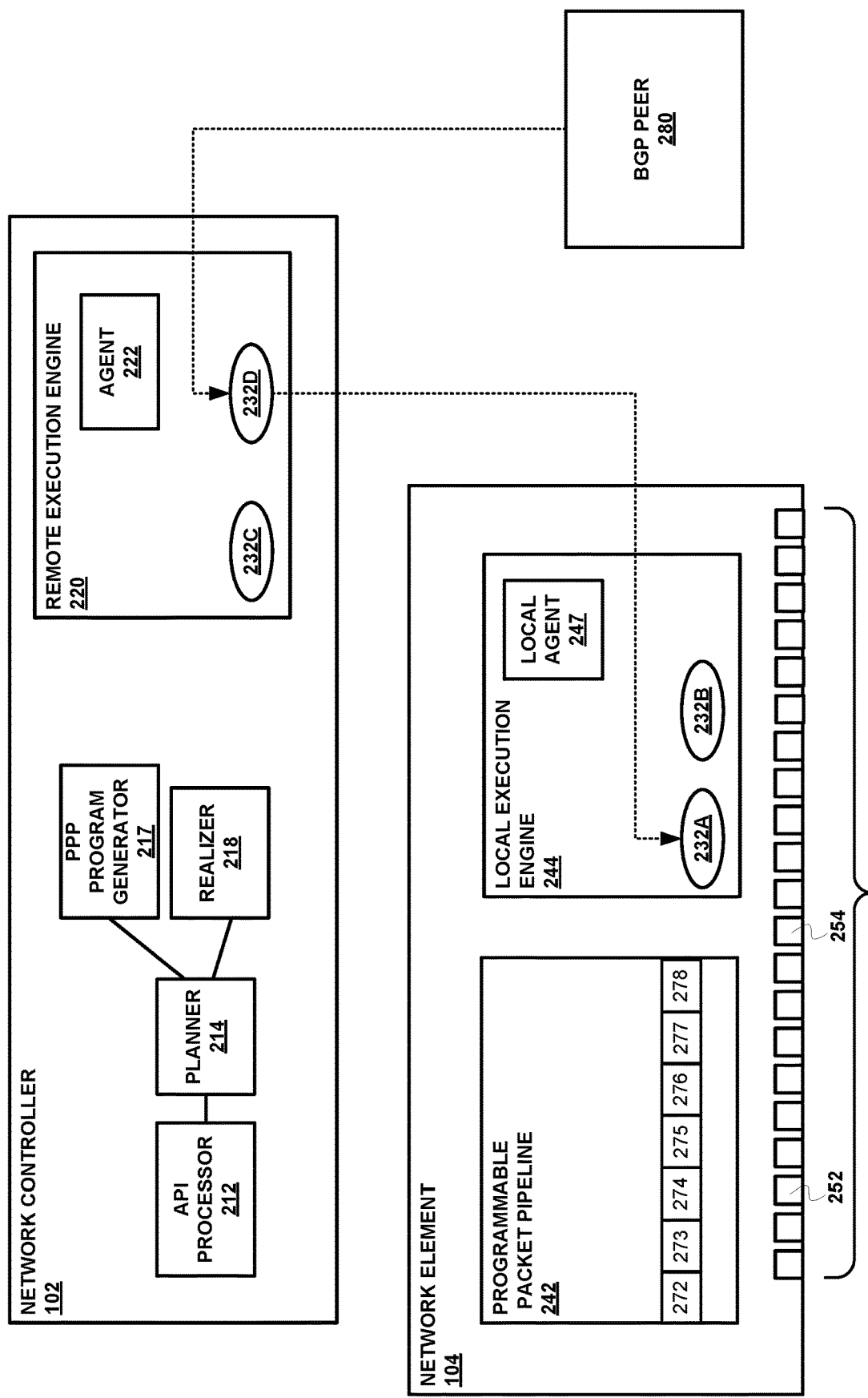
FIG. 2G is a block diagram illustrating an example of a remote downloadable packet processing plug-in interoperating with a local downloadable packet processing plug-in and a remote downloadable packet processing plug-in, in accordance with aspects of the disclosure.

FIG. 2G is a block diagram illustrating an example of a remote downloadable packet processing plug-in interoperating with a local downloadable packet processing plug-in and a remote downloadable packet processing plug-in, in accordance with aspects of the disclosure. In the example shown in FIG. 2G, plug-in 232D is configured to receive Border Gateway Protocol (BGP) updates from a BGP peer 280. When BGP peer 280 provides a BGP update to plug-in 232D, plug-in 232D processes the update to determine routing changes that may affect the routing of network packets by network element 104. Plug-in 232D can forward the routing changes to plug-in 232A, which is configured to interoperate with plug-in 232D. In some aspects, plug-in 232A can process offload conditions when pipeline 242 encounters a network packet that requires some BGP based routing. In this aspect, plug-in 232D is a part of the control plane, and plug-in 232A is part of the data plane. In some other aspects, plug-in 232A may reconfigure tables accessed by pipeline 242 to reflect the routing changes communicated by BGP peer 280 via plug-in 232D. In this aspect, both plug-ins 232D and 232A are a part of the control plane.

The examples illustrated in FIGS. 2A-2G show two local plug-ins 232A and 232B and two remote plug-ins 232C and 232D. It is noted that a network element or a network controller can have a single plug-in or can have more than two plug-ins. Further, a network controller can have a different number of plug-ins than a network element. Moreover, a network controller may not have any plug-ins. Additionally, certain functionality has been ascribed to some of the plug-ins discussed above, it is noted that plug-ins can implement a numerous functions other than that described above.

Figure 3:
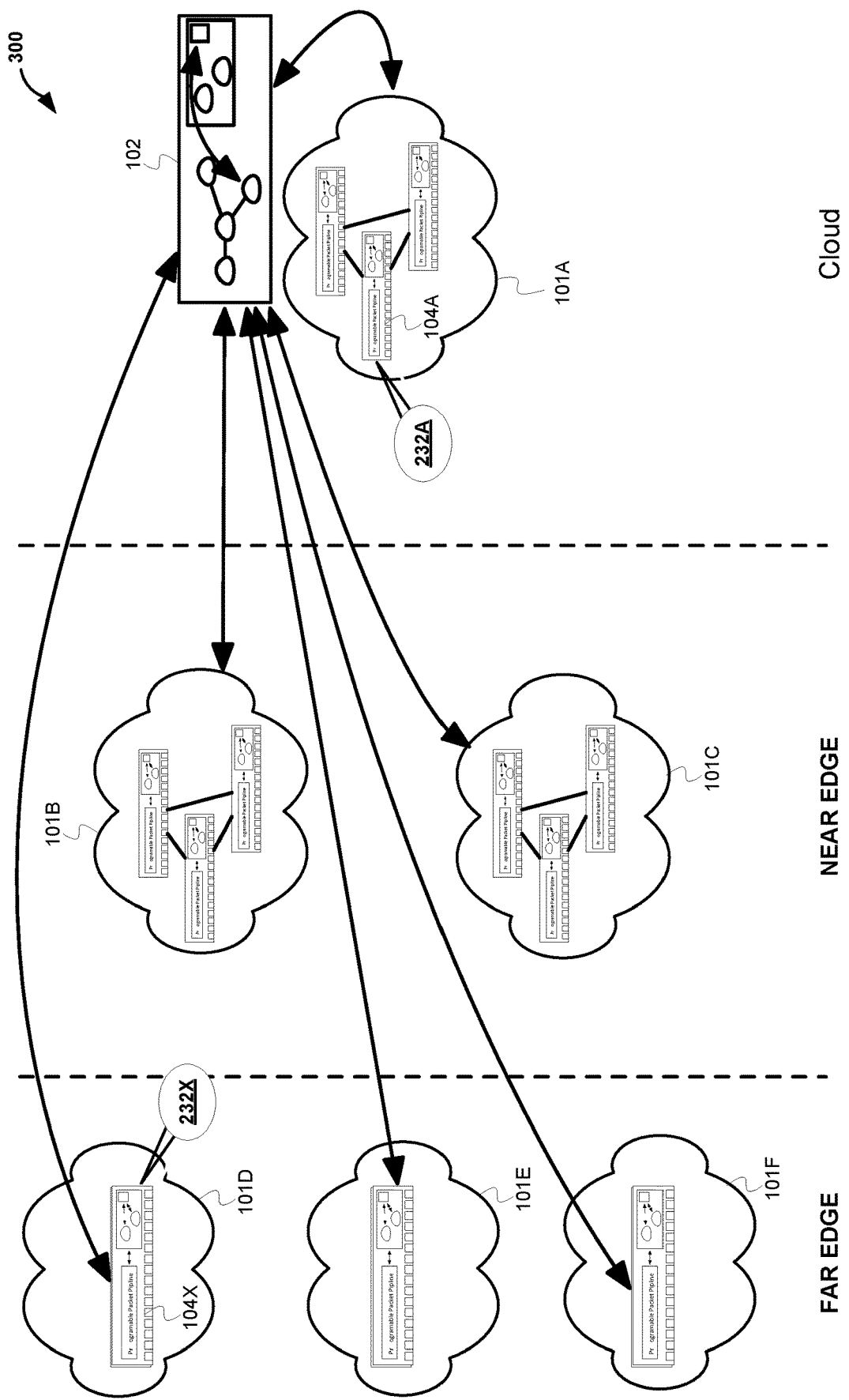
FIG. 3 is a conceptual diagram illustrating a control plane and management plane, in accordance with aspects of the disclosure.

FIG. 3 is a conceptual diagram illustrating a control plane and a management plane, in accordance with aspects of the disclosure. The example shown in FIG. 3 includes a cloud computing environment 300 having a near edge including networks 101B and 101C, and a far edge including networks 101D-101F. Near edge refers to the infrastructure edge nearest a cloud data center network 101A and far edge refers to the infrastructure furthest away from the cloud data center network 101A and closest to end-users. In the example shown in FIG. 3, network controller 102 can operate in the control plane with respect to network elements in cloud data center network 101A (including network element 104A). Further, network controller 102 can manage and configure near edge network elements in networks 101B and 101C and far edge network elements in networks 101D-101F (including network element 104X). In this example, network controller 102 operates in a management plane with respect to networks 101A-101F.

In some aspects, network controller can configure network elements 104A and 104X with plug-ins 232A and 232X, respectively, where plug-ins 232A and 232X are configured to interoperate with one another. As one example, plug-ins 232A and 232X may implement some or all of a network protocol such that network data transfer between network elements 104A and 104X can be made more efficient. For instance, plug-in 232A may perform preprocessing of network data in accordance with the protocol such that plug-in 232X can more efficiently and/or more quickly process incoming network data from network element 104A. As another example, plug-ins 232A and 232X may implement new features or capabilities without requiring an update to the hardware of a network element 104.

Figure 4:
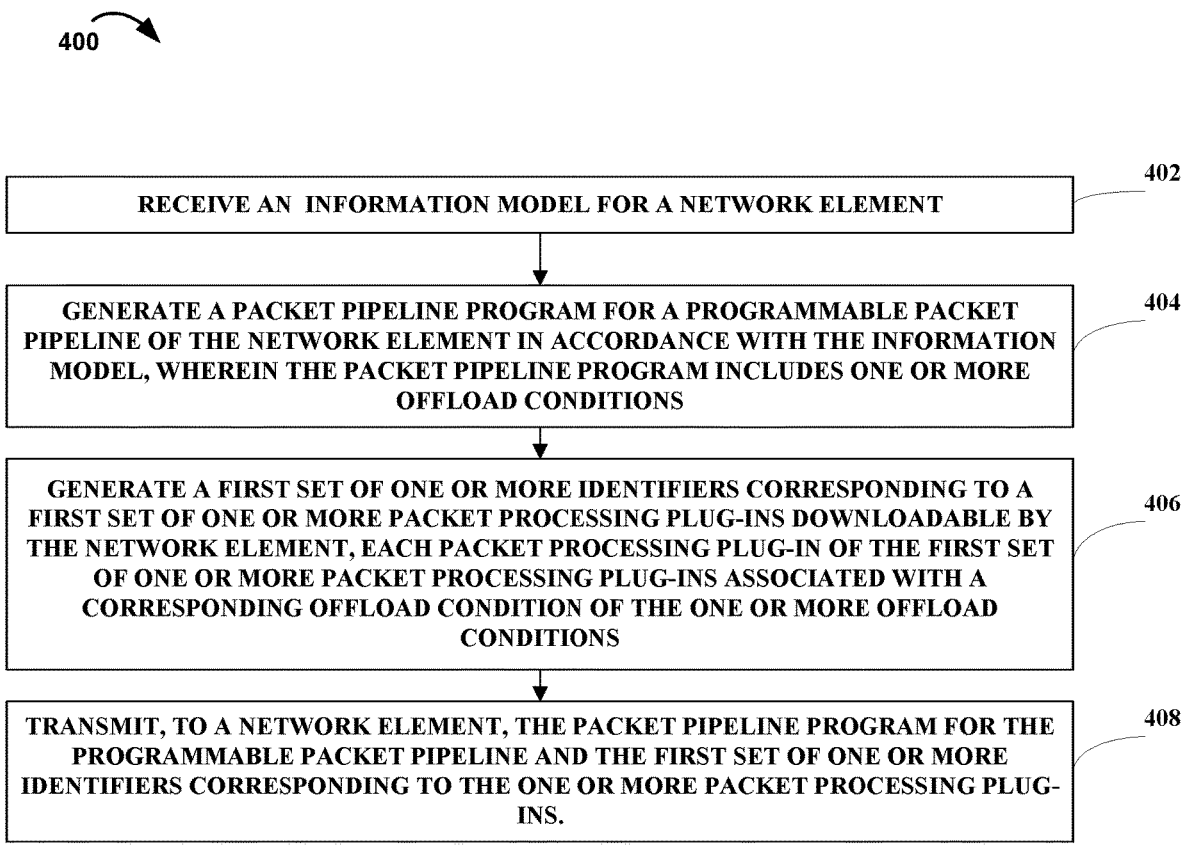
FIG. 4 is a flowchart illustrating example operations of a method for creating a data plane in a disaggregated network operating system, in accordance with aspects of the disclosure.

FIG. 4 is a flowchart 400 illustrating example operations of a method for creating a data plane in a disaggregated network operating system, in accordance with aspects of the disclosure. The operations of the method may be performed, for example, by a network controller such as network controller 102. The operations begin at block 402, where the network controller receives an information model for a network element. The information model may be a newly created information model, or it may be a modified version of a previously existing information model. As noted above, the information model may have property values organized according to a schema that describes the desired capabilities and features of the network element associated with the information model. Additionally, the information model and/or the schemas included in the information model may identify one or more downloadable packet processing plug-ins.

At block 404, the network controller generates a packet pipeline program for a programmable packet pipeline of the network element in accordance with the information model. The network controller may generate a packet pipeline that includes one or more offload conditions. As an example, an offload condition may be a condition detected by a pipeline where some or all of the processing of a network packet is not performed by the pipeline itself.

At block 406, the network controller generates a first set of one or more identifiers corresponding to one or more packet processing plug-ins downloadable by the network element. Each of the one or more packet processing plug-ins are associated with a corresponding offload conditions. The identifiers can take various forms. The identifier may be a Uniform Resource Locator (URL), a path name for a file, an index of a file, a Globally Unique Identifier (GUID) associated with a file and so forth.

At block 408, the network controller provides the generated pipeline program and the set of one of more identifiers to the network element.

Figure 5:
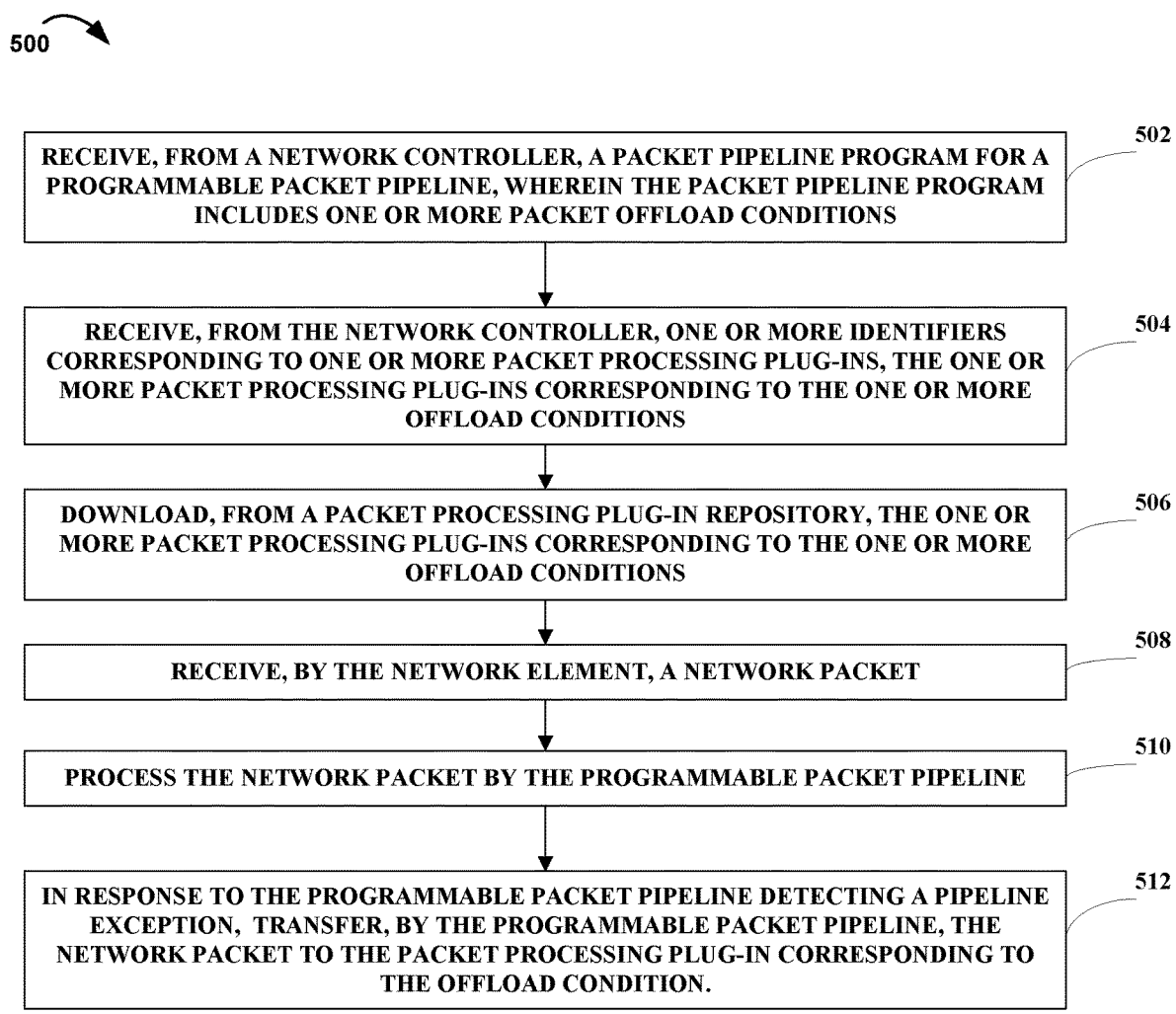
FIG. 5 is a flowchart illustrating example operations of a method for processing packets by a data plane of a disaggregated network operating system.

FIG. 5 is a flowchart 500 illustrating example operations of a method for processing packets by a data plane of a disaggregated network operating system. The operations of the method may be performed, for example, by a network element such as network element 104. The operations begin at block 502, where the network element receives, from a network controller, a packet pipeline program for a programmable packet pipeline or the network element. The packet pipeline program includes one or more packet offload conditions.

At block 504, the network element receives, from the network controller, one or more identifiers corresponding to one or more packet processing plug-ins. As discussed above, the identifiers may be a URL, a path name for a file containing the plug-in, an index of the file, a GUID associated with the file and so forth. The one or more packet processing plug-ins correspond to the one or more offload conditions. In some aspects, the network element may receive the packet pipeline program and the one or more identifiers in separate transmissions. In some other aspects, the network element may receive the packet pipeline program and the one or more identifiers in a single transmission.

At block 506, the network element downloads, from a repository, the one or more packet processing plug-ins using the identifiers corresponding to the plug-ins. The network element can install the plug-ins after their download.

At block 508, the network element receives a network packet via a port on the network element.

At block 510, the programmable packet pipeline of the network element begins to process the network packet.

At block 512, the programmable packet pipeline, acting in accordance with the packet pipeline program, detects an offload condition. In response to detecting the offload condition, the programmable packet pipeline forwards the network packet to the packet processing plug-in corresponding to the offload condition.

Figure 6:
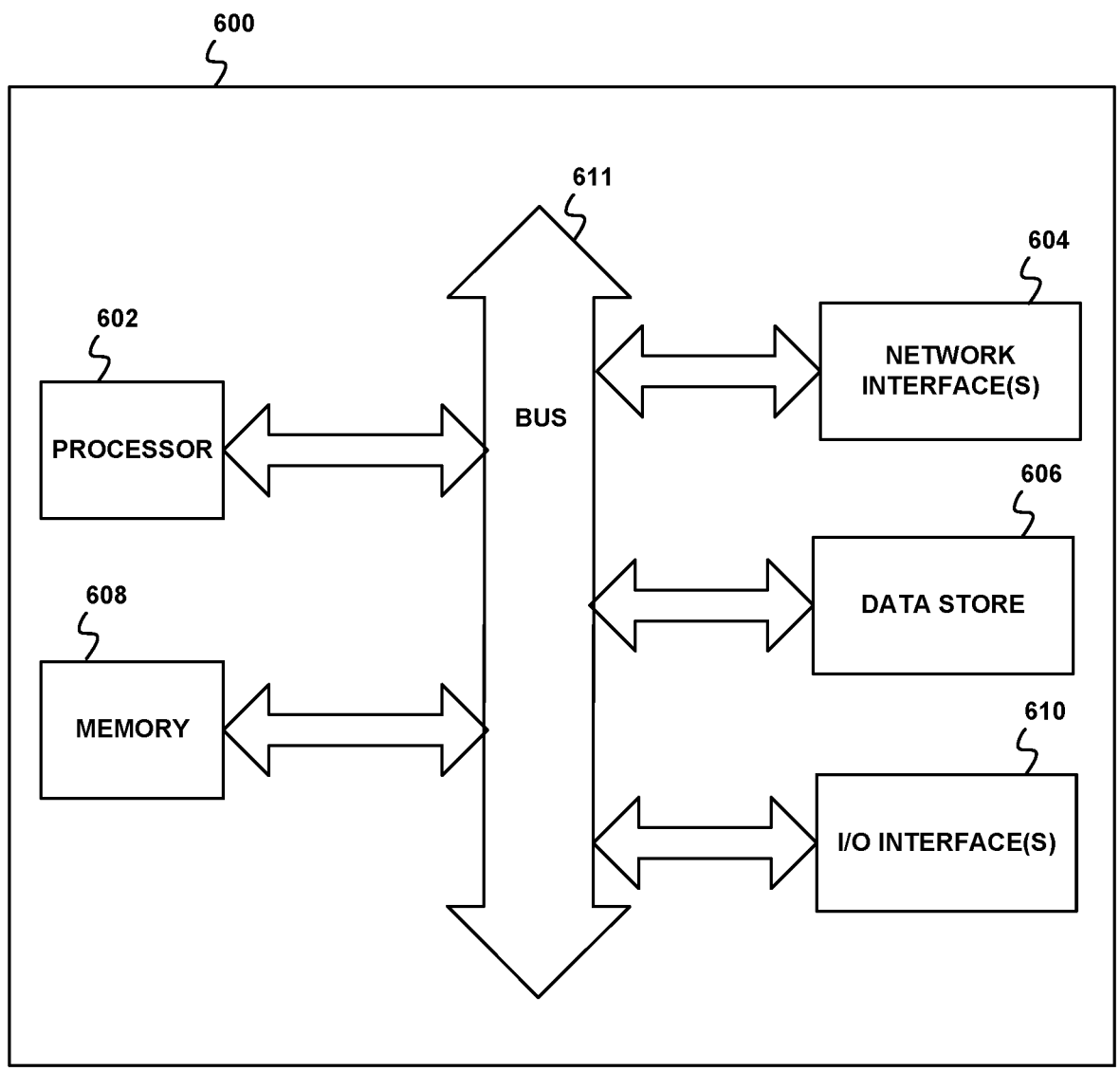
FIG. 6 is a block diagram of an example apparatus for use as a network controller.

FIG. 6 is a block diagram of an example apparatus for use as a network controller. In some implementations, apparatus 600 may be a network controller as described above with reference to FIGS. 1-3. In addition to network controller, the apparatus 600 can be referred to in implementations as a control module, a shelf controller, a shelf processor, a system controller, etc. The apparatus 600 can include a processor 602 (possibly including multiple processors, multiple cores, multiple nodes, or implementing multi-threading, among other examples). The processor 602 can be any custom made or commercially available processor, a central processing unit (CPU), general purpose processor (GPP), multicore processor, an auxiliary processor among several processors associated with the apparatus 600, a semiconductor-based microprocessor (in the form of a microchip or chipset), or generally any device for executing software instructions. The apparatus 600 can also include a network interface 604, a data store 606, memory 608, an I/O interface 610, and the like, all of which may be communicatively coupled to one another and to the processor 602, for example, by a bus 611. Bus 611 can be any type of bus, including busses such as PCI, ISA, PCI-Express, HyperTransport®, InfiniBand®, NuBus®, AHB, AXI, etc.

The network interface 604 can be used to enable the apparatus 600 to communicate on a data communication network, such as to communicate to a management system, to network elements (e.g., network elements 104), to other hosts and network devices, and the like. The network interface 604 can include, for example, an Ethernet module. The network interface 604 can include address, control, and/or data connections to enable appropriate communications on the network.

The data store 606 can be used to store data, such as control plane information, provisioning data, Operations, Administration, Maintenance, and Provisioning (OAM&P) data, etc. The data store 606 can include any of volatile memory elements (e.g., random access memory (RAM, such as DRAM, SRAM, SDRAM, and the like)), nonvolatile memory elements (e.g., ROM, hard drive, flash drive, solid state drive (SSD), CDROM, and the like), and combinations thereof. Moreover, the data store 606 can incorporate electronic, magnetic, optical, and/or other types of storage media.

The memory 608 can include any of volatile memory elements (e.g., random access memory (RAM, such as DRAM, SRAM, SDRAM, etc.)), nonvolatile memory elements (e.g., ROM, hard drive, flash drive, solid state drive (SSD), CDROM, etc.), and combinations thereof. Moreover, the memory 608 may incorporate electronic, magnetic, optical, and/or other types of storage media. Note that the memory 608 can have a distributed architecture, where various components are situated remotely from one another, but may be accessed by the processor 602. The memory 608 can include computer instructions executable by the processor 602 to implement the functionality or techniques of the implementations described with reference to FIGS. 1-5. Any one of these functionalities may be partially (or entirely) implemented in hardware or on the processor 602. For example, the functionality may be implemented with an application specific integrated circuit, in logic implemented in the processor 602, in a co-processor on a peripheral device or card, etc. Further, realizations may include fewer or additional components not illustrated in FIG. 6. Although illustrated as being coupled to the bus 611, the memory 608 may be coupled to the processor 602.

The I/O interface 610 includes components for the apparatus 600 to communicate with other devices.

Figure 7:
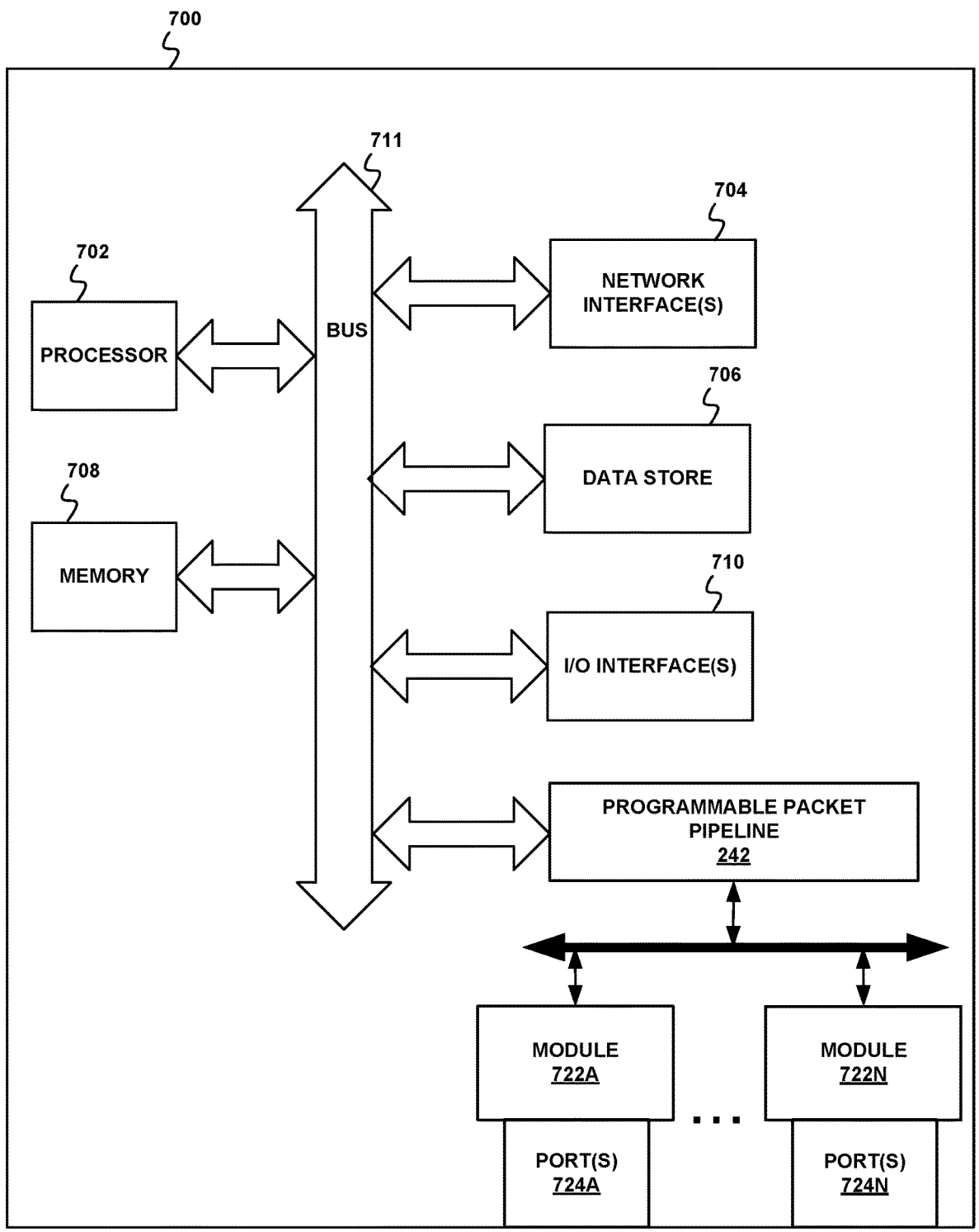
FIG. 7 is a block diagram of an example apparatus for use as a network element.

FIG. 7 is a block diagram of an example apparatus for use as a network element. In some implementations, apparatus 700 may be an implementation of network element 104 as described above with reference to FIGS. 1-5. In some aspects, the apparatus 600 can be a packet switch. In some other aspects, the apparatus 600 can be a router. Those of ordinary skill in the art will recognize the systems and methods described herein can operate with other types of network elements and other implementations that support networking.

In the example shown in FIG. 7, the apparatus 700 can include a processor 702 (possibly including multiple processors, multiple cores, multiple nodes, or implementing multi-threading, among other examples). The processor 702 can be any custom made or commercially available processor, a central processing unit (CPU), general purpose processor (GPP), multicore processor, an auxiliary processor among several processors associated with the apparatus 700, a semiconductor-based microprocessor (in the form of a microchip or chipset), or generally any device for executing software instructions. The apparatus 700 can also include a network interface 704, a data store 706, memory 708, an I/O interface 710, programmable packet pipeline 242, and the like, all of which may be communicatively coupled to one another and to the processor 702, for example, by a bus 711. Bus 711 can be any type of bus, including busses such as PCI, ISA, PCI-Express, HyperTransport®, InfiniBand®, NuBus,® AHB, AXI, etc.

The network interface 704 can be used to enable the apparatus 700 to communicate on a data communication network, such as to communicate to a management system and/or to a network controller (e.g., network controller 102). The network interface 704 can include, for example, an Ethernet module. The network interface 704 can include address, control, and/or data connections to enable appropriate communications on the network.

The data store 706 can be used to store data, such as data plane information. The data store 706 can include any of volatile memory elements (e.g., random access memory (RAM, such as DRAM, SRAM, SDRAM, and the like)), nonvolatile memory elements (e.g., ROM, hard drive, flash drive, solid state drive (SSD), CDROM, and the like), and combinations thereof. Moreover, the data store 706 can incorporate electronic, magnetic, optical, and/or other types of storage media.

The memory 708 can be used to store data, including data plane information. For example, memory 708 can store tables such as routing tables, configuration data, state data, etc. The memory 708 can include any of volatile memory elements (e.g., random access memory (RAM, such as DRAM, SRAM, SDRAM, etc.)), nonvolatile memory elements (e.g., ROM, hard drive, flash drive, solid state drive (SSD), CDROM, etc.), and combinations thereof. Moreover, the memory 708 may incorporate electronic, magnetic, optical, and/or other types of storage media. Note that the memory 708 can have a distributed architecture, where various components are situated remotely from one another, but may be accessed by the processor 702. The memory 708 can include computer instructions executable by the processor 702 to implement the functionality or techniques of the implementations described with reference to FIGS. 1-5. Any one of these functionalities may be partially (or entirely) implemented in hardware or on the processor 702. For example, the functionality may be implemented with an application specific integrated circuit, in logic implemented in the processor 702, in a co-processor on a peripheral device or card, etc. Further, realizations may include fewer or additional components not illustrated in FIG. 7. Although illustrated as being coupled to the bus 711, the memory 708 may be coupled to the processor 702.

The I/O interface 710 includes components for the apparatus 700 to communicate with other devices.

Additionally, apparatus 700 can include a plurality of line modules 722A-722N connected to programmable packet pipeline 242. The line modules 722A-722N may also be known as line cards, circuit packs, pluggable modules, etc. and generally refer to components fixedly or removably mounted within apparatus 700. Each of the line modules 722A-722N can include numerous electronic devices and/or optical devices mounted on a circuit board along with various interconnects, including interfaces to apparatus 700 and/or programmable packet pipeline 242, etc.

The line modules 722A-722N include corresponding ports 724A-724N, such as a plurality of Ethernet ports. For example, a line module (e.g., any of line modules 722A-722N) can include a plurality of physical ports disposed on an exterior of the line module for receiving ingress/egress connections. Some or all of the ports 724A-724N may be implementations of ports 250 of FIGS. 2A-2G. Additionally, the line modules 722A-722N can include switching components to form a switching fabric via the programmable packet pipeline between all of the ports 724A-724N, allowing data traffic to be switched/forwarded between the ports 724A-724N on the various line modules 722A-722N. The switching fabric can be a combination of hardware, software, firmware, etc. that moves data coming into the network element 104 out by the correct port of ports 724A-724N towards the destination of the data. "Switching fabric" includes switching units in a node; integrated circuits contained in the switching units; and programming that allows switching paths to be controlled. Note, the switching fabric can be distributed on the modules 722A-722N, in a separate module (not shown), integrated on the line module 722, or a combination thereof.

The programmable packet pipeline 242 can be specialized hardware and/or software that is designed to provide efficient low latency processing of network packets. For example, when implemented in hardware and/or firmware, pipeline 242 can be a set of field programmable gate arrays (FPGAs) or other programmable circuitry that is specialized for operations typically performed on network packets. This can differentiate the programmable packet pipeline 242 from processor 702 in that processor 702 is typically a general purpose processor and is not configured for specialized operations typically performed on network packets. Tables, instructions, and other information used by programmable packet pipeline 242 can be stored in memory 708, or can be stored in memory (not shown in FIG. 7) specific to programmable packet pipeline 242.

In some aspects, apparatus 700 may be a rack-mounted shelf where the functionality of the modules 722A-722N is built-in, i.e., a "pizza-box" configuration. FIG. 7 is meant to provide a functional view, and those of ordinary skill in the art will recognize actual hardware and firmware implementations may vary.

FIGS. 1-7 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in consideration of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the described implementation options.

CLAUSES

Clause 1. A non-transitory computer-readable medium having stored thereon instructions that, when executed by one or more processors of a network controller, cause the network controller to: receive an information model for a network element; generate a packet pipeline program for a programmable packet pipeline of the network element in accordance with the information model, where the packet pipeline program includes instructions to detect one or more offload conditions; generate a first set of one or more identifiers, each identifier in the first set of one or more identifiers corresponding to one of a first set of one or more packet processing plug-ins downloadable by the network element, each packet processing plug-in in the first set of one or more packet processing plug-ins associated with one of the one or more offload conditions; and transmit, to the network element, the packet pipeline program for the programmable packet pipeline and the first set of one or more identifiers.

Clause 2. The non-transitory computer-readable medium of clause 1, where the instructions further include instructions to: generate a second set of one or more identifiers, each identifier in the second set of one or more identifiers corresponding to one of a second set of one or more packet processing plug-ins downloadable by the network controller, each packet processing plug-in in the second set of one or more packet processing plug-ins associated with one of the one or more offload conditions; and download, for execution on the network controller, the second set of one or more packet processing plug-ins.

Clause 3. The non-transitory computer-readable medium of clause 1 or clause 2, where the information model includes schema data describing one or more capabilities to be implemented in the network element.

Clause 4. The non-transitory computer-readable medium of any one of clauses 1-3, where the one or more packet processing plug-ins include one or more libraries of executable modules, one or more executable plug-in modules, or one or more containers including one or more executable modules.

Clause 5. The non-transitory computer-readable medium of any one of clauses 1-4, where in response to receiving a change in the information model for the network element, the network controller is configured to: generate a second packet pipeline program for the programmable packet pipeline of the network element in accordance with the change in the information model, where the second packet pipeline program includes instructions to detect one or more second offload conditions; generate a second set of one or more identifiers, each identifier in the second set of one or more identifiers corresponding to one of a second set of one or more packet processing plug-ins downloadable by the network element, each packet processing plug-in of the second set of one or more packet processing plug-ins associated with one of the one or more second offload conditions; and transmit, to the network element, the second packet pipeline program for the programmable packet pipeline and the second set of one or more identifiers corresponding to the second set of one or more packet processing plug-ins.

Clause 6. The non-transitory computer-readable medium of any one of clauses 1-5, where the network controller includes a first network element, and where the instructions further include instructions to: generate a second set of one or more identifiers, each identifier in the second set of one or more identifiers corresponding to one of a second set of one or more packet processing plug-ins downloadable by a second network element, each packet processing plug-in in the second set of one or more packet processing plug-ins associated with one of the one or more offload conditions; and download, for execution on the second network element, the second set of one or more packet processing plug-ins, where a first packet processing plug-in in the first set of one or more packet processing plug-ins on the first network element is configured to interoperate with a second packet processing plug-in in the second set of one or more plug-ins on the second network element.

Clause 7. The non-transitory computer-readable medium of any one of clauses 1-6, where a packet processing plug-in in the first set of one or more packet processing plug-ins includes one of a protocol processing plug-in or a packet analysis plug-in.

Clause 8. A non-transitory computer-readable medium having stored thereon instructions that, when executed by one or more processors of a network element, cause the network element to: receive, from a network controller, a packet pipeline program for a programmable packet pipeline of the network element, where the packet pipeline program includes instructions to detect one or more offload conditions; receive, from the network controller, one or more identifiers, each of the one or more identifiers corresponding to one of one or more packet processing plug-ins, each of the one or more packet processing plug-ins corresponding to one of the one or more offload conditions; download, for execution on the network element, the one or more packet processing plug-ins; receive, by the network element, a network packet; process the network packet by the programmable packet pipeline; and in response to the programmable packet pipeline detecting an offload condition while processing the network packet, transferring, by the programmable packet pipeline, the network packet to the packet processing plug-in corresponding to the offload condition.

Clause 9. The non-transitory computer-readable medium of clause 8, where a packet processing plug-in of the one or more packet processing plug-ins is configured to: receive the network packet from the programmable packet pipeline; modify the network packet; and return the modified network packet to the programmable packet pipeline.

Clause 10. The non-transitory computer-readable medium of any one of clauses 8-9, where a packet processing plug-in of the one or more packet processing plug-ins is configured to: receive the network packet from the programmable packet pipeline; modify the network packet; and redirect the network packet to an egress port of the network element.

Clause 11. The non-transitory computer-readable medium of clause 10, where the packet processing plug-in includes a first packet processing plugin and the network element includes a first network element, and where the instructions to redirect the network packet to the egress port of the network element include instructions to redirect the network packet to a second packet processing plug-in on a second network element, where the first packet processing plug-in is configured to interoperate with the second packet processing plug-in.

Clause 12. The non-transitory computer-readable medium of any one of clauses 8-11, where a packet processing plug-in of the one or more packet processing plug-ins is configured to: receive a second network packet from the programmable packet pipeline; process the second network packet by the programmable packet pipeline; and in response to the programmable packet pipeline detecting a second offload condition while processing the second network packet, transferring, by the programmable packet pipeline, the second network packet to a second packet processing plug-in corresponding to the second offload condition, the second packet processing plug-in executing on the network controller.

Clause 13. The non-transitory computer-readable medium of any one of clauses 8-12, where the packet pipeline program for the programmable packet pipeline includes executable instructions configured for execution on specialized packet processing circuitry.

Clause 14. The non-transitory computer-readable medium of clause 13, where the one or more packet processing plug-ins include executable instructions configured for execution on a general purpose processor.

Clause 15. An apparatus including: one or more processors; a programmable packet pipeline; and a network element executable by the one or more processors and configured to cause the one or more processors to: receive, from a network controller, a packet pipeline program for the programmable packet pipeline, where the packet pipeline program includes instructions to detect one or more offload conditions, receive, from the network controller, one or more identifiers, each of the one or more identifiers corresponding to one of one or more packet processing plug-ins, each of the one or more packet processing plug-ins corresponding to one of the one or more offload conditions, download, for execution by the one or more processors of the network element, the one or more packet processing plug-ins, where the programmable packet pipeline is configured to: receive a network packet, process the network packet, and in response to the programmable packet pipeline detecting an offload condition while processing the network packet, transferring, by the programmable packet pipeline, the network packet to the packet processing plug-in corresponding to the offload condition.

Clause 16. The apparatus of clause 15, where a packet processing plug-in of the one or more packet processing plug-ins is configured to: receive the network packet from the programmable packet pipeline; modify the network packet; and return the modified network packet to the programmable packet pipeline.

Clause 17. The apparatus of any one of clauses 15-16, where a packet processing plug-in of the one or more packet processing plug-ins is configured to: receive the network packet from the programmable packet pipeline; modify the network packet; and redirect the network packet to an egress port of the network element.

Clause 18. The apparatus of any one of clauses 15-17, where a packet processing plug-in of the one or more packet processing plug-ins is configured to: receive a second network packet from the programmable packet pipeline; process the second network packet by the programmable packet pipeline; and in response to the programmable packet pipeline detecting a second offload condition while processing the second network packet, transferring, by the programmable packet pipeline, the second network packet to a second packet processing plug-in corresponding to the second offload condition, the second packet processing plug-in executing on the network controller.

Clause 19. The apparatus of any one of clauses 15-18, where the programmable packet pipeline includes specialized packet processing circuitry.

Clause 20. The apparatus of clause 19, where the one or more packet processing plug-ins include executable instructions configured for execution on a general purpose processor of the apparatus.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A non-transitory computer-readable medium having stored thereon instructions that, when executed by one or more processors of a network element, cause the network element to:
   receive, from a network controller, a packet pipeline program for a programmable packet pipeline of the network element, wherein the packet pipeline program includes instructions to detect one or more offload conditions;
   receive, from the network controller, one or more identifiers, each of the one or more identifiers corresponding to one of one or more packet processing plug-ins, each of the one or more packet processing plug-ins corresponding to one of the one or more offload conditions, the identifiers defining one of a Uniform Resource Locator (URL), a path name for a file, an index of a file, or a Globally Unique Identifier (GUID) associated with a file,
   download, for execution on the network element, the one or more packet processing plug-ins;
   receive, by the network element, a network packet;
   process the network packet by the programmable packet pipeline; and
   in response to the programmable packet pipeline detecting an offload condition while processing the network packet, transferring, by the programmable packet pipeline, the network packet to the packet processing plug-in corresponding to the offload condition, wherein the packet processing plug-in locally executes packet-level modifications autonomously based on pre-stored processing logic without communication or coordination with a separate control plane of management processor of the network element.

2. The non-transitory computer-readable medium of claim 1, wherein a packet processing plug-in of the one or more packet processing plug-ins is configured to:
   receive the network packet from the programmable packet pipeline;
   modify the network packet; and
   return the modified network packet to the programmable packet pipeline such that the packet is restarted in the pipeline.

3. The non-transitory computer-readable medium of claim 1, wherein a packet processing plug-in of the one or more packet processing plug-ins is configured to:
   receive the network packet from the programmable packet pipeline;
   modify the network packet; and
   redirect the network packet to an egress port of the network element prior to a destruction event of the pipeline.

4. The non-transitory computer-readable medium of claim 3, wherein the packet processing plug-in comprises a first packet processing plugin and the network element comprises a first network element, and wherein the instructions to redirect the network packet to the egress port of the network element comprise instructions to redirect the network packet to a second packet processing plug-in on a second network element, wherein the first packet processing plug-in is configured to interoperate with the second packet processing plug-in.

5. The non-transitory computer-readable medium of claim 1, wherein a packet processing plug-in of the one or more packet processing plug-ins is configured to:
receive a second network packet from the programmable packet pipeline;
process the second network packet by the programmable packet pipeline; and
in response to the programmable packet pipeline detecting a second offload condition while processing the second network packet, transferring, by the programmable packet pipeline, the second network packet to a second packet processing plug-in corresponding to the second offload condition, the second packet processing plug-in executing on the network controller.

6. The non-transitory computer-readable medium of claim 1, wherein the packet pipeline program for the programmable packet pipeline comprises executable instructions configured for execution on specialized packet processing circuitry.

7. The non-transitory computer-readable medium of claim 6, wherein the one or more packet processing plug-ins comprise executable instructions configured for execution on a general purpose processor.

8. An apparatus comprising:
one or more processors;
a programmable packet pipeline; and
a computer-readable medium having stored thereon instructions executable by the one or more processors and configured to cause the one or more processors to:
receive, from a network controller, a packet pipeline program for the programmable packet pipeline, wherein the packet pipeline program includes instructions to detect one or more offload conditions,
receive, from the network controller, one or more identifiers, each of the one or more identifiers corresponding to one of one or more packet processing plug-ins, each of the one or more packet processing plug-ins corresponding to one of the one or more offload conditions, the identifiers defining one of a Uniform Resource Locator (URL), a path name for a file, an index of a file, or a Globally Unique Identifier (GUID) associated with a file,
download, for execution by the one or more processors, the one or more packet processing plug-ins,
wherein the programmable packet pipeline is configured to:
receive a network packet,
process the network packet, and
in response to the programmable packet pipeline detecting an offload condition while processing the network packet, transferring, by the programmable packet pipeline, the network packet to the packet processing plug-in corresponding to the offload condition, where the packet processing plug-in locally executes packet-level modifications autonomously base on pre-stored processing logic without communication or coordination with a separate control plane or management processor of the network element.

9. The apparatus of claim 8, wherein a packet processing plug-in of the one or more packet processing plug-ins is configured to:
receive the network packet from the programmable packet pipeline;
modify the network packet; and
return the modified network packet to the programmable packet pipeline.

10. The apparatus of claim 8, wherein a packet processing plug-in of the one or more packet processing plug-ins is configured to:
receive the network packet from the programmable packet pipeline;
modify the network packet; and
redirect the network packet to an egress port of the apparatus.

11. The apparatus of claim 8, wherein a packet processing plug-in of the one or more packet processing plug-ins is configured to:
receive a second network packet from the programmable packet pipeline;
process the second network packet by the programmable packet pipeline; and
in response to the programmable packet pipeline detecting a second offload condition while processing the second network packet, transferring, by the programmable packet pipeline, the second network packet to a second packet processing plug-in corresponding to the second offload condition, the second packet processing plug-in executing on the network controller.

12. The apparatus of claim 8, wherein the programmable packet pipeline comprises specialized packet processing circuitry.

13. The apparatus of claim 12, wherein the one or more packet processing plug-ins comprise executable instructions configured for execution on a general purpose processor of the apparatus.

14. A method for creating a data plane in a disaggregated network operating system:
receive, from a network controller, a packet pipeline program for a programmable packet pipeline of a network element, wherein the packet pipeline program includes instructions to detect one or more offload conditions;
receive, from the network controller, one or more identifiers, each of the one or more identifiers corresponding to one of one or more packet processing plug-ins, each of the one or more packet processing plug-ins corresponding to one of the one or more offload conditions, the identifiers defining one of a Uniform Resource Locator (URL), a path name for a file, an index of a file, or a Globally Unique Identifier (GUID) associated with a file,
download, for execution on the network element, the one or more packet processing plug-ins;
receive, by the network element, a network packet;
process the network packet by the programmable packet pipeline; and
in response to the programmable packet pipeline detecting an offload condition while processing the network packet, transferring, by the programmable packet pipeline, the network packet to the packet processing plug-in corresponding to the offload condition, wherein the packet processing plug-in locally executes packet-level modifications autonomously based on pre-stored processing logic without communication or coordination with a separate control plane or management processor of the network element.

15. The method of claim 14, wherein a packet processing plug-in of the one or more packet processing plug-ins is configured to:
   receive the network packet from the programmable packet pipeline;
   modify the network packet; and
   return the modified network packet to the programmable packet pipeline.

16. The method of claim 14, wherein a packet processing plug-in of the one or more packet processing plug-ins is configured to:
   receive the network packet from the programmable packet pipeline;
   modify the network packet; and
   redirect the network packet to an egress port of the network element.

17. The method of claim 16, wherein the packet processing plug-in comprises a first packet processing plugin and the network element comprises a first network element, and wherein the instructions to redirect the network packet to the egress port of the network element comprise instructions to redirect the network packet to a second packet processing plug-in on a second network element, wherein the first packet processing plug-in is configured to interoperate with the second packet processing plug-in.

18. The method of claim 14, wherein a packet processing plug-in of the one or more packet processing plug-ins is configured to:
   receive a second network packet from the programmable packet pipeline;
   process the second network packet by the programmable packet pipeline; and
   in response to the programmable packet pipeline detecting a second offload condition while processing the second network packet, transferring, by the programmable packet pipeline, the second network packet to a second packet processing plug-in corresponding to the second offload condition, the second packet processing plug-in executing on the network controller.

19. The method of claim 14, wherein the packet pipeline program for the programmable packet pipeline comprises executable instructions configured for execution on specialized packet processing circuitry.

20. The method of claim 19, wherein the one or more packet processing plug-ins comprise executable instructions configured for execution on a general purpose processor.

* * * * *